United States Patent
Athmanathan Panneer Selvam et al.

(10) Patent No.: US 12,430,701 B1
(45) Date of Patent: Sep. 30, 2025

(54) DYNAMICALLY GENERATING GEOSPATIAL-BASED-PROPORTION METRICS BASED ON TRANSPORTATION EVENTS RELATIVE TO GEOCODED AREAS

(71) Applicant: Lyft, Inc., San Francisco, CA (US)

(72) Inventors: Praveen Athmanathan Panneer Selvam, Sunnyvale, CA (US); Davide Crapis, San Francisco, CA (US); Daniel Freund, New York, NY (US); Jiayu Gong, Fremont, CA (US); Jae Ik Jin, San Francisco, CA (US); Hao Yi Ong, San Francisco, CA (US); Shengke Zhou, San Bruno, CA (US)

(73) Assignee: Lyft, Inc., San Francisco, CA (US)

( * ) Notice: Subject to any disclaimer, the term of this patent is extended or adjusted under 35 U.S.C. 154(b) by 0 days.

(21) Appl. No.: 16/944,428

(22) Filed: Jul. 31, 2020

(51) Int. Cl.
  *G06Q 50/40* (2024.01)
  *G06Q 10/0639* (2023.01)
(52) U.S. Cl.
  CPC ....... *G06Q 50/40* (2024.01); *G06Q 10/06393* (2013.01)
(58) Field of Classification Search
  CPC ........... G06Q 30/0205; G06Q 30/0255; G06Q 40/08; G06Q 30/02; G06Q 10/06311;
(Continued)

(56) References Cited

U.S. PATENT DOCUMENTS 7,663,528 B1  2/2010  Malakian et al.
9,358,986 B2  6/2016  Hunt
(Continued)

FOREIGN PATENT DOCUMENTS

WO  WO-2020159431 A1 * 8/2020 ............. G06N 20/00

OTHER PUBLICATIONS

Ma, et al. "Spatio-temporal pricing for ridesharing platforms." Operations Research 70.2 (2022): 1025-1041. [online], [retrieved on Dec. 17, 2022]. Retrieved from the Internet <https://arxiv.org/abs/1801.04015> (Year: 2018).*

(Continued)

*Primary Examiner* — Jerry O'Connor
*Assistant Examiner* — Michael R Koester
(74) *Attorney, Agent, or Firm* — Keller Preece PLLC

(57) ABSTRACT

This disclosure describes methods, non-transitory computer readable media, and systems that can determine locations and geospatial scores for pick-up events and other transportation events relative to geocoded areas at a given time period and generate geospatial-based proportion metrics for provider devices corresponding to such transportation events as proportional premiums for performing the events. For example, the systems determine locations of provider devices across geocoded areas for a particular time period. The systems can generate geospatial scores for transportation events of the provider devices occurring within the time period based on the specific locations and times of the events relative to the geocoded areas. Based on the geospatial scores and cumulative metrics accounting for such transportation events relative to the geocoded areas, the systems can generate geospatial-based-proportion metrics corresponding to such events for a graphical display on provider devices.

20 Claims, 14 Drawing Sheets

(58) Field of Classification Search
CPC .... G06Q 30/0202; G06Q 50/30; G06Q 10/04; G06Q 30/0261; G06Q 30/0267; G06Q 10/00; G06F 16/951

See application file for complete search history.

(56) References Cited

U.S. PATENT DOCUMENTS

| | | |
|---|---|---|
| 9,864,778 B1 | 1/2018 | Strand et al. |
| 10,032,181 B1 | 7/2018 | Madhow et al. |
| 10,157,436 B2 | 12/2018 | Samocha et al. |
| 10,552,773 B1 | 2/2020 | Shah et al. |
| 10,706,487 B1 | 7/2020 | Chachra et al. |
| 10,794,713 B2 | 10/2020 | Magazinik et al. |
| 11,035,683 B2 | 6/2021 | Marco |
| 11,514,546 B2 | 11/2022 | Chachra et al. |
| 11,551,139 B1* | 1/2023 | Finamore ............... G06N 5/047 |
| 11,763,411 B1 | 9/2023 | Chachra et al. |
| 11,887,483 B2 | 1/2024 | Bajaj et al. |
| 2005/0015316 A1 | 1/2005 | Salluzzo |
| 2005/0021225 A1 | 1/2005 | Kantarjiev et al. |
| 2006/0069601 A1 | 3/2006 | Simon et al. |
| 2008/0195428 A1 | 8/2008 | O'Sullivan |
| 2009/0119006 A1 | 5/2009 | Silver et al. |
| 2009/0210262 A1 | 8/2009 | Clark et al. |
| 2009/0325556 A1 | 12/2009 | Lee et al. |
| 2010/0268450 A1 | 10/2010 | Stephen |
| 2011/0161116 A1 | 6/2011 | Peak et al. |
| 2011/0184640 A1 | 7/2011 | Coleman et al. |
| 2011/0246404 A1 | 10/2011 | Lehmann et al. |
| 2012/0246039 A1 | 9/2012 | Fain et al. |
| 2012/0316763 A1 | 12/2012 | Haynes, III et al. |
| 2013/0041708 A1 | 2/2013 | Jackson, Jr. et al. |
| 2013/0132140 A1 | 5/2013 | Amin et al. |
| 2013/0246207 A1 | 9/2013 | Novak et al. |
| 2013/0253969 A1 | 9/2013 | Das et al. |
| 2014/0129951 A1 | 5/2014 | Amin et al. |
| 2014/0156410 A1 | 6/2014 | Wuersch et al. |
| 2014/0172439 A1 | 6/2014 | Conway et al. |
| 2014/0207375 A1 | 7/2014 | Lerenc |
| 2014/0279654 A1 | 9/2014 | Lievens et al. |
| 2014/0337123 A1 | 11/2014 | Nuernberg et al. |
| 2014/0358435 A1 | 12/2014 | Bell et al. |
| 2015/0039214 A1 | 2/2015 | Mcclellan et al. |
| 2015/0046080 A1 | 2/2015 | Wesselius et al. |
| 2015/0081399 A1 | 3/2015 | Mitchell et al. |
| 2015/0154810 A1 | 6/2015 | Tew et al. |
| 2015/0161554 A1 | 6/2015 | Sweeney et al. |
| 2015/0161564 A1 | 6/2015 | Sweeney et al. |
| 2015/0206267 A1 | 7/2015 | Khanna et al. |
| 2015/0242772 A1 | 8/2015 | Backof, II et al. |
| 2015/0262430 A1 | 9/2015 | Farrelly et al. |
| 2015/0339928 A1 | 11/2015 | Ramanujam |
| 2015/0371157 A1 | 12/2015 | Jaffe |
| 2015/0379437 A1 | 12/2015 | Reich |
| 2016/0026936 A1 | 1/2016 | Richardson et al. |
| 2016/0027307 A1 | 1/2016 | Abhyanker et al. |
| 2016/0034845 A1 | 2/2016 | Hiyama et al. |
| 2016/0098649 A1 | 4/2016 | Ifrach et al. |
| 2016/0117610 A1 | 4/2016 | Ikeda et al. |
| 2016/0148164 A1 | 5/2016 | Luk et al. |
| 2016/0171574 A1 | 6/2016 | Paulucci et al. |
| 2016/0171882 A1 | 6/2016 | Handley |
| 2016/0209220 A1 | 7/2016 | Laetz |
| 2016/0320198 A1 | 11/2016 | Liu et al. |
| 2016/0321566 A1 | 11/2016 | Liu et al. |
| 2017/0034110 A1 | 2/2017 | Bijor et al. |
| 2017/0061801 A1 | 3/2017 | Huang et al. |
| 2017/0098377 A1 | 4/2017 | Marco et al. |
| 2017/0102243 A1 | 4/2017 | Samocha et al. |
| 2017/0124506 A1 | 5/2017 | Khan |
| 2017/0147951 A1 | 5/2017 | Meyer et al. |
| 2017/0154348 A1 | 6/2017 | Biswas et al. |
| 2017/0169366 A1 | 6/2017 | Klein et al. |
| 2017/0169377 A1 | 6/2017 | Liu et al. |
| 2017/0169535 A1 | 6/2017 | Tolkin et al. |
| 2017/0191842 A1 | 7/2017 | Igor et al. |
| 2017/0227370 A1* | 8/2017 | O'Mahony ............ G06Q 10/02 |
| 2017/0262790 A1 | 9/2017 | Khasis |
| 2017/0353536 A1 | 12/2017 | Shraer et al. |
| 2017/0372235 A1 | 12/2017 | Dayama et al. |
| 2018/0025407 A1 | 1/2018 | Zhang et al. |
| 2018/0032928 A1 | 2/2018 | Li et al. |
| 2018/0075380 A1 | 3/2018 | Perl et al. |
| 2018/0101878 A1 | 4/2018 | Marueli et al. |
| 2018/0121847 A1* | 5/2018 | Zhao ................ G06Q 10/06315 |
| 2018/0121958 A1 | 5/2018 | Aist et al. |
| 2018/0158322 A1 | 6/2018 | McDonnell et al. |
| 2018/0174446 A1 | 6/2018 | Wang |
| 2018/0190040 A1 | 7/2018 | Batten et al. |
| 2018/0211541 A1 | 7/2018 | Rakah et al. |
| 2018/0225796 A1* | 8/2018 | Liu ........................ G06Q 50/30 |
| 2018/0232840 A1 | 8/2018 | Liu |
| 2019/0066251 A1 | 2/2019 | Samocha et al. |
| 2019/0080340 A1* | 3/2019 | Berger ............... G06Q 30/0205 |
| 2019/0295259 A1 | 9/2019 | Deskevich |
| 2019/0340928 A1 | 11/2019 | Goldman et al. |
| 2020/0082313 A1 | 3/2020 | Crapis et al. |
| 2020/0082315 A1 | 3/2020 | Crapis et al. |
| 2020/0250600 A1 | 8/2020 | Gupta et al. |
| 2021/0072035 A1 | 3/2021 | Magazinik et al. |
| 2021/0192292 A1 | 6/2021 | Zhai |
| 2021/0192555 A1* | 6/2021 | Tang ....................... G06N 3/08 |
| 2022/0187084 A1 | 6/2022 | Qin et al. |
| 2024/0070571 A1 | 2/2024 | Mayer et al. |

OTHER PUBLICATIONS

Lyft Help; "Personal Power Zones"; Date downloaded Jan. 12, 2022; https://help.lyft.com/hc/e/articles/115012926807-Personal-Power-Zones.

European Search Report for European Patent Application No. EP 17195935.6, mailed Dec. 11, 2017, 9 pages.

Office Action as received in European Application 17195935.6 dated Oct. 18, 2019.

Summons to attend oral proceedings as received in European Application 17195935.6 dated Jun. 16, 2020.

Office Action as received in Israeli Application 254949 dated Sep. 24, 2019.

Office Action as received in Israeli Application 254949 dated Jul. 26, 2020.

U.S. Appl. No. 16/539,965, Jun. 8, 2021, Office Action.
U.S. Appl. No. 14/985,565, Aug. 29, 2017, Office Action.
U.S. Appl. No. 14/985,565, Feb. 21, 2018, Office Action.
U.S. Appl. No. 14/985,565, May 29, 2018, Office Action.
U.S. Appl. No. 14/985,565, Dec. 17, 2018, Office Action.
U.S. Appl. No. 14/985,565, Apr. 4, 2019, Office Action.
U.S. Appl. No. 14/985,565, Sep. 16, 2019, Office Action.
U.S. Appl. No. 14/985,565, Jun. 4, 2020, Notice of Allowance.
U.S. Appl. No. 15/290,366, Jun. 25, 2019, Office Action.
U.S. Appl. No. 15/290,366, Jan. 10, 2020, Office Action.
U.S. Appl. No. 15/290,366, May 13, 2020, Office Action.
U.S. Appl. No. 15/290,366, Oct. 27, 2020, Office Action.
U.S. Appl. No. 15/290,366, Mar. 22, 2021, Office Action.
U.S. Appl. No. 14/880,021, Jan. 13, 2017, Office Action.
U.S. Appl. No. 14/880,021, Jul. 11, 2017, Office Action.
U.S. Appl. No. 14/880,021, Dec. 5, 2017, Office Action.
U.S. Appl. No. 14/880,021, Apr. 17, 2018, Office Action.
U.S. Appl. No. 14/880,021, Aug. 23, 2018, Notice of Allowance.
U.S. Appl. No. 16/177,085, Nov. 5, 2020, Office Action.
U.S. Appl. No. 16/177,085, Mar. 25, 2021, Office Action.
U.S. Appl. No. 16/177,085, Jul. 18, 2022, Office Action.
U.S. Appl. No. 16/780,712, Jun. 24, 2022, Notice of Allowance.
U.S. Appl. No. 16/921,698, Jul. 26, 2022, Notice of Allowance.
Chawdhry, Amit, Uber: Users are more likely to pay surge pricing if their phone battery is low, May 25, 2016. Forbes.com https://www.forbes.conn/sites/annitchowdhry/2016/05/25/uber-low-battery/#732fbb8074b3 (Year: 2016).

U.S. Appl. No. 16/125,563, Nov. 30, 2018, Office Action.
U.S. Appl. No. 16/125,563, May 1, 2019, Office Action.

(56) References Cited

OTHER PUBLICATIONS

U.S. Appl. No. 16/125,563, Oct. 8, 2019, Notice of Allowance.
U.S. Appl. No. 16/125,551, Aug. 14, 2020, Office Action.
U.S. Appl. No. 16/125,527, Aug. 18, 2020, Office Action.
U.S. Appl. No. 16/125,540, Aug. 19, 2020, Office Action.
U.S. Appl. No. 15/810,028, Dec. 2, 2019, Office Action.
U.S. Appl. No. 15/810,028, Apr. 30, 2019, Notice of Allowance.
U.S. Appl. No. 15/290,366, Jun. 29, 2021, Office Action.
U.S. Appl. No. 16/177,085, Feb. 18, 2022, Office Action.
U.S. Appl. No. 16/780,712, Mar. 25, 2022, Office Action.
U.S. Appl. No. 16/921,698, Mar. 31, 2022, Office Action.
U.S. Appl. No. 17/063,403, Dec. 28, 2022, Office Action.
U.S. Appl. No. 17/063,403, Mar. 22, 2023, Notice of Allowance.
Alexander et al., Origin-destination trips by purpose and time of day inferred from mobile phone data, 2015, Elsevier, Transportation Research Part C 58, pp. 240-250 (Year: 2015).
U.S. Appl. No. 16/539,965, Apr. 21, 2023, Office Action.
U.S. Appl. No. 18/059,071, Mar. 30, 2023, Office Action.
U.S. Appl. No. 18/059,071, May 2, 2023, Notice of Allowance.
U.S. Appl. No. 16/539,965, Sep. 26, 2022, Office Action.
U.S. Appl. No. 16/177,085, Oct. 27, 2022, Notice of Allowance.
U.S. Appl. No. 16/539,965, Oct. 26, 2023, Office Action.
U.S. Appl. No. 18/469,127, Apr. 11, 2024, Office Action.
U.S. Appl. No. 18/469,127, May 15, 2024, Notice of Allowance.
U.S. Appl. No. 18/048,545, Jul. 2, 2024, Office Action.
U.S. Appl. No. 18/048,545, Nov. 26, 2024, Notice of Allowance.
U.S. Appl. No. 17/554,530, Mar. 6, 2025, Office Action.
U.S. Appl. No. 18/356,101, Jul. 3, 2025, Office Action.

\* cited by examiner

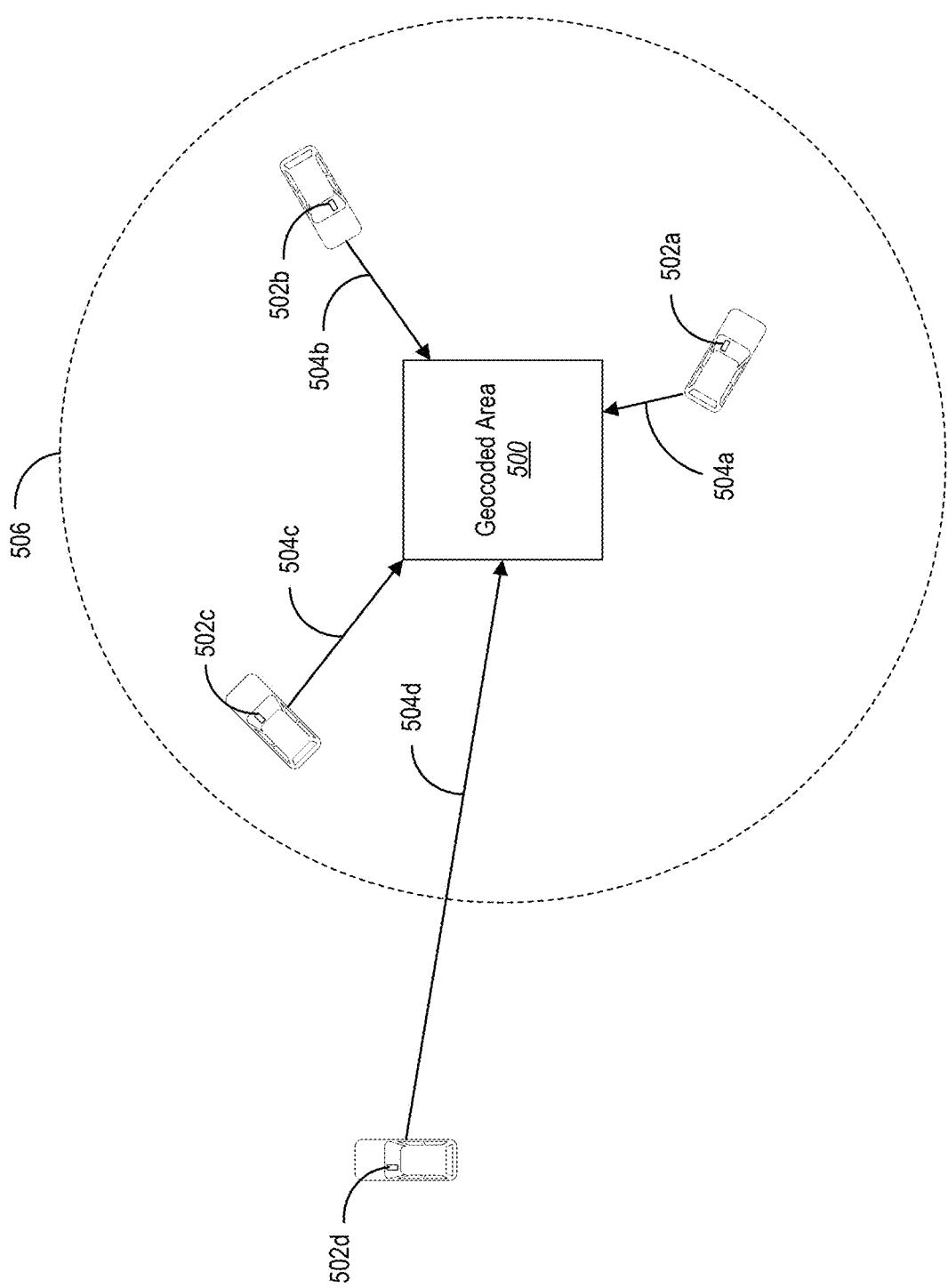

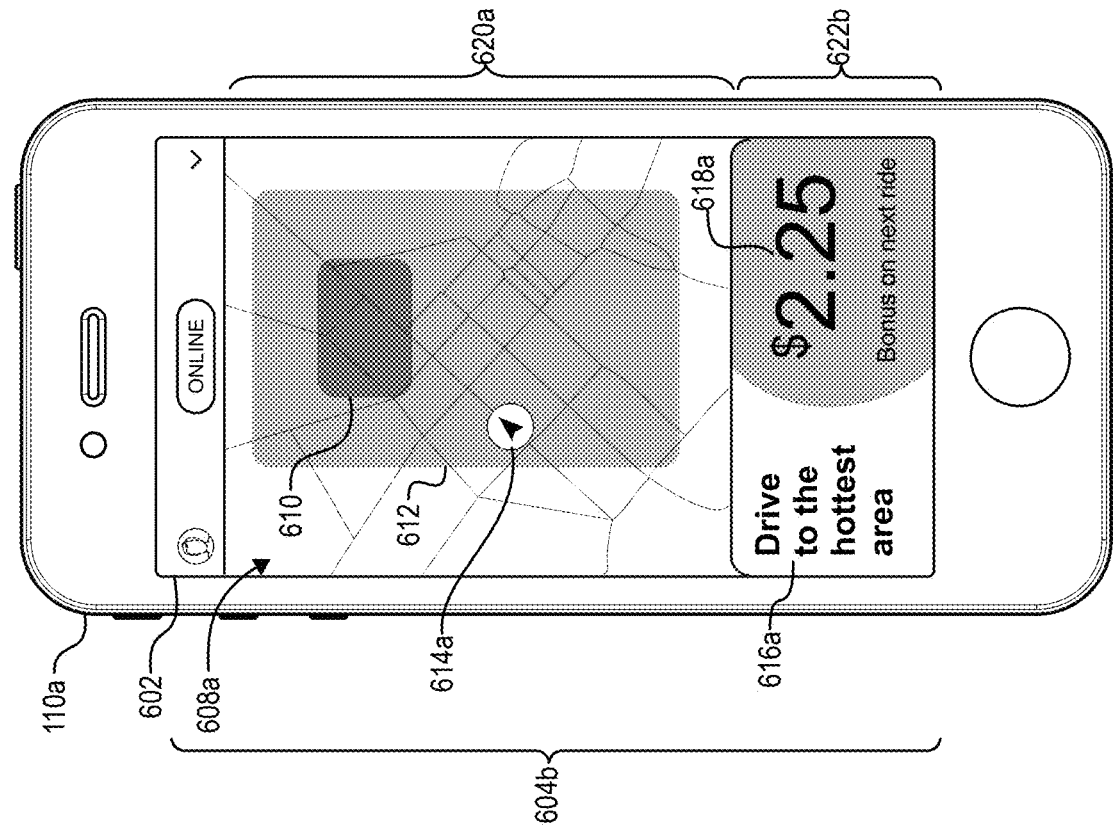
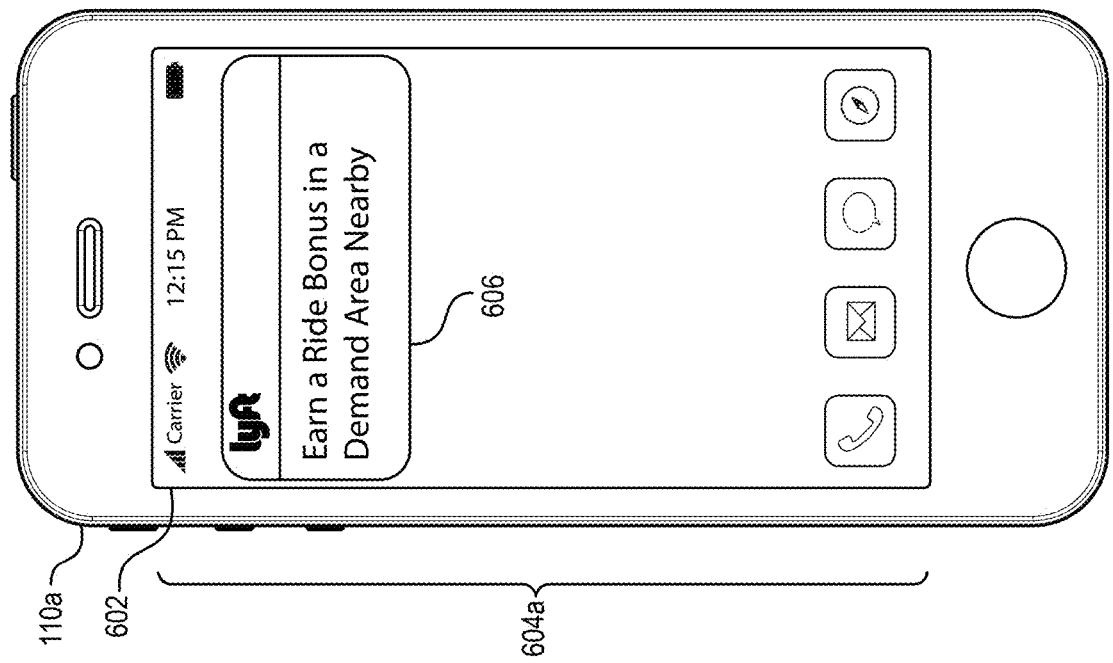

DYNAMICALLY GENERATING GEOSPATIAL-BASED-PROPORTION METRICS BASED ON TRANSPORTATION EVENTS RELATIVE TO GEOCODED AREAS

BACKGROUND

Transportation-network systems commonly use web and mobile applications to manage on-demand requests for transportation. Some on-demand transportation-network systems, for example, receive requests from persons through a mobile application requesting transportation from one geographic location to another geographic location. To fulfill such requests, on-demand transportation-network systems traditionally use a computational model that matches requests from persons seeking transportation with nearby transportation providers, such as autonomous vehicles or drivers of transportation vehicles. By efficiently matching requests with nearby transportation providers, on-demand transportation-network systems can use a computational model to incentivize transportation providers to travel to high-volume-request areas and to reduce estimated arrival times of transportation providers to a requester's pick-up location.

Some conventional on-demand transportation-network systems use static computational models to match requests with nearby transportation providers. Static computational models often cannot efficiently match requests with providers during volatile or high-volume time periods of requests. Specifically, static computation models determine premiums based on providers fulfilling transportation requests in a particular geographic location at a specific time. By tying the premiums to only the specific time, the static computational models require providers to fulfill the transportation request (e.g., arrive at the particular geographic location) at the specific time to receive the premium. This often results in providers rejecting matches to specific locations with unpredictable travel times or during high volume time periods due to the uncertainty associated with obtaining the premiums.

In addition to the inefficiencies of a static computational model, some conventional transportation-network systems use separate computational models to account for premiums for transportation providers and for matching requests with nearby transportation providers. By employing separate computational models, existing transportation-network systems can decrease the accuracy of providing marginal incentives to transportation providers to travel to target areas. Lack of, or inaccurate, accounting of expenditures in incentivizing transportation providers to move to such areas based on changing volumes of requests and provider availability can result in conventional transportation-network systems providing inaccurate premiums to transportation providers, resulting in decreased transportation request rates by requesters and transportation acceptance rates by transportation providers.

Accordingly, conventional on-demand transportation-network systems may create problems for people requesting transportation and transportation providers with static or isolated computational models. For example, conventional on-demand transportation-network systems may rigidly (and inaccurately) provide premiums for transportation providers to pick up requesters based on a static computational model-without accounting for factors affecting a successful match of requesters and providers and the variability of provider premiums to travel to target areas. By employing static or isolated computational models, on-demand transportation-network systems may also rigidly distribute premiums without accounting for factors that result in inaccurate allocation of premiums to providers, resulting in increased difficulty ensuring that providers comply with allocations to target areas.

SUMMARY

This disclosure describes one or more embodiments of methods, non-transitory computer readable media, and systems that solve the foregoing problems in addition to providing other benefits. In particular, the disclosed systems can determine locations and geospatial scores for pick-up events and other transportation events relative to geocoded areas at a given time period and generate geospatial-based-proportion metrics for provider devices corresponding to such transportation events as proportional premiums for performing the events. In some cases, for example, the systems determine locations of provider devices across geocoded areas for a particular time period. The systems can generate geospatial scores for transportation events of the provider devices occurring within the time period based on the specific locations and times of the events relative to the geocoded areas. Based on the geospatial scores and cumulative metrics accounting for such transportation events relative to the geocoded areas, the systems can generate geospatial-based-proportion metrics corresponding to such events for display on provider devices. By incentivizing the flow of transportation vehicles with geospatial-based-proportion metrics that more accurately represent proportional premiums, the disclosed systems can improve the efficiency and flexibility of allocating and guiding transportation vehicles across geocoded areas based on transportation events in relative space and time.

BRIEF DESCRIPTION OF THE DRAWINGS

The detailed description refers to the drawings briefly described below.

FIGS. 5A-5B illustrate the transportation matching system determining geospatial scores and geospatial-based-proportion metrics for transportation providers relative to geocoded areas in accordance with one or more embodiments.

FIGS. 6A-6C illustrate a provider device presenting graphical user interfaces notifying a provider of (or identifying) a geospatial-based premium for target geocoded areas in accordance with one or more embodiments.

DETAILED DESCRIPTION

Figure 1:
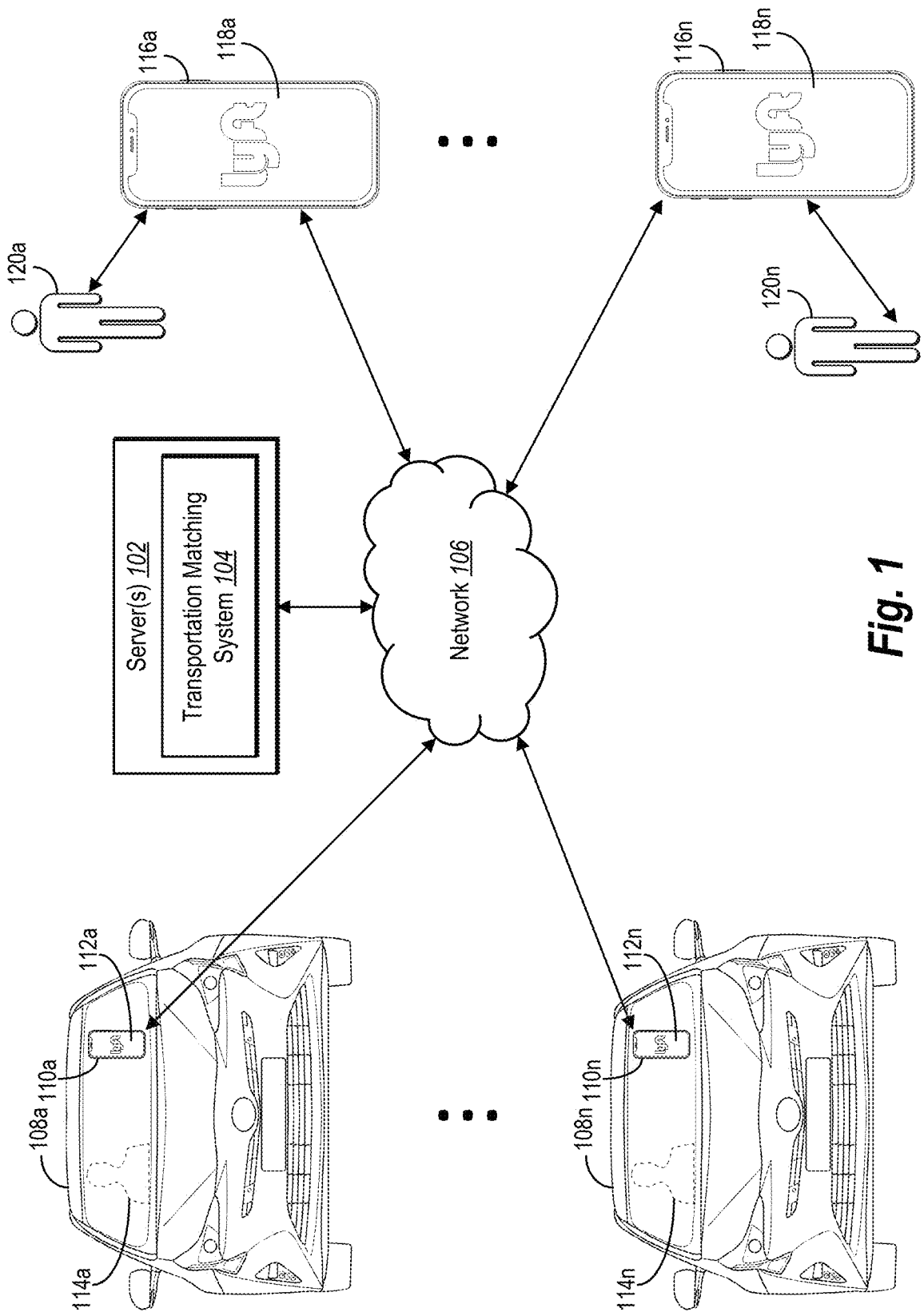
FIG. 1 illustrates a block diagram of an environment for implementing a transportation matching system in accordance with one or more embodiments.

This disclosure describes one or more embodiments of a transportation matching system that determines locations and geospatial scores for transportation events relative to geocoded areas at a given time period and dynamically generates geospatial-based-proportion metrics as proportional premiums for provider devices corresponding to such transportation events. In particular, the transportation matching system determines locations of provider devices across the geocoded areas for the time period and generates geospatial scores for transportation events of the provider devices during the time period relative to the geocoded areas. The transportation matching system can further determine cumulative metrics for the transportations events relative to the geocoded areas during the time period. By utilizing geospatial scores for transportation events and cumulative-events metrics corresponding to the geocoded areas, the transportation matching system can generate geospatial-based-proportion metrics corresponding to such events for a graphical display on provider devices.

In some embodiments, the transportation matching system further utilizes geocode-specific repositories and regional repositories to balance geospatial-based-proportion metrics across the geocoded areas. To illustrate, the transportation matching system can determine differences in cumulative-events metrics stored in geocode-specific repositories for the geocoded areas and cumulated geospatial-based-proportion metrics for the geocoded areas during the time period. By determining these differences and utilizing the geospatial scores for the transportation events, the transportation matching system can accurately generate and provide proportional premiums to provider devices based on the geospatial-based-proportion metrics and incentivize vehicle flow across geocoded areas for a given time period.

In one or more embodiments, the transportation matching system determines locations of provider devices across the geocoded areas for a time period. For example, the transportation matching system can monitor the locations of provider devices within or near a set of geocoded areas of a region. The transportation matching system can also determine the locations during a specific time period for the transportation matching system to use in generating premiums for certain geocoded areas deliverable to provider devices. By determining the locations of provider devices during specific times, the transportation matching system can determine how to allocate transportation vehicles across the geocoded areas and provide corresponding premiums to provider devices for relocating.

As suggested above, the transportation matching system can utilize the locations of provider devices to generate geospatial scores of transportation events occurring within or near the geocoded areas. In some embodiments, the transportation matching system can identify pick-up events, drop-off events, or other transportation events associated with provider devices during the time period. The transportation matching system can then generate geospatial scores for the transportation events according to the locations and times of the transportation events relative to the geocoded areas. The geospatial scores can provide an indication of where and how the transportation events occur relative to each geocoded area of one or more regions.

In addition to generating geospatial scores for the transportation events, the transportation matching system can determine cumulative-events metrics for the geocoded areas and the time period. For instance, the transportation matching system can identify the location of transportation events that occur within each geocoded area, such as pick-up events or provider devices accepting requests for transportation by requesters. For each transportation event within a threshold distance of a particular geocoded area, the transportation matching system can increment a value of a cumulative-events metric for the geocoded area. Furthermore, the transportation matching system can store the cumulative-events metric in a geocode-specific repository for the geocoded area.

As further indicated above, the transportation matching system can also generate geospatial-based-proportion metrics as proportional premiums for provider devices performing transportation events relative to specific geocoded areas. For example, the transportation matching system can identify a volume of transportation events within or around the geocoded areas. The transportation matching system can subsequently generate the geospatial-based-proportion metrics for provider devices based on the geospatial scores for transportation events performed by the provider devices and corresponding portions of the cumulative-events metrics for the geocoded areas. In some cases, the cumulative-events metric for a given geocoded area and a geospatial score can provide bases for the transportation matching system to determine a geospatial-based-proportion metric for a provider device. The transportation matching system can thus generate geospatial-based-proportion metrics for provider devices based on both cumulative events relative to a geocoded area and the proximity and time of transportation events associated with the provider devices relative to the geocoded area.

In one or more embodiments, the transportation matching system can utilize a number of repositories to generate geospatial-based-proportion metrics across geocoded areas in a region. To illustrate, the transportation matching system can manage a regional repository associated with the region comprising geocoded areas. The transportation matching system can generate proportional premiums for provider devices according to geospatial-based-proportion metrics based on cumulative-events metrics from the geocode-specific repositories and a cumulative-reserve metric from the regional repository associated with the geocode-specific repositories. Accordingly, the transportation matching system can balance the use of geocode-specific repositories and the regional repository for geospatial-based-proportion metrics for a plurality of provider devices across a plurality of geocoded areas.

As suggested above, the transportation matching system improves and overcomes several technical deficiencies that hinder conventional transportation-network systems. For instance, the transportation matching system improves the accuracy and efficiency with which a transportation-network system allocates and incentivizes the flow of transportation providers across geocoded areas based geospatial-based-proportion metrics. By implementing a static or isolated computational model, existing transportation-network systems fail to accurately account for transportation events that occur in and around a geographic location. Such computational models rigidly provide premiums for transportation events only at a specific time and place and merely incentivize precise and lucky flow of transportation vehicles. The conventional systems thus distribute premiums inaccurately and disproportionately due to the rigidity of the static or isolated computational models employed.

In contrast, the transportation matching system provides proportional premiums by generating geospatial-based-proportion metrics based on the anticipated number of provider devices across geocoded areas to facilitate allocating transportation providers. The geospatial-based-proportion metrics result in more accurately rewarding transportation providers and corresponding computing devices that relocate to (or near) a geocoded area with proportional premiums. Such proportional premiums incentivize later compliance from transportation providers and devices with allocation of such providers to specific geocoded areas or regions. The geospatial-based-proportion metrics can thus result in efficiently matching projected transportation requests with transportation providers by positioning transportation providers in high-volume request locations ahead of time as measured by request fulfillment metrics.

In some embodiments, the transportation matching system also improves accuracy and proportionality of premiums by integrating the use of location data (e.g., from GPS devices or other location devices in provider devices) to determine geospatial scores when generating geospatial-based-proportion metrics. In contrast to conventional systems that rigidly tie premiums for providers to fixed areas during fixed time periods, the transportation matching system can accurately determine premiums for providers according to detected locations and times of transportation events involving provider devices relative to one or more geocoded areas. Specifically, the transportation matching system can integrate the location data (e.g., GPS signals from GPS devices) into a flexible computational model that generates accurate geospatial-based-proportion metrics for providing proportional premiums to provider devices, which further results in more accurate future transportation-provider allocations and compliance.

In addition to improving accuracy and efficiency, the transportation matching system also improves the flexibility of existing transportation-network systems by integrating transportation-vehicle allocations or corresponding provider-device allocations, cumulative-events metrics, and geospatial-based-proportion metrics into a unified computational model. In some cases, the disclosed transportation system can integrate the location (or allocation) of provider devices across geocoded areas—and the time and location from a particular geocoded area—into determining a proportional premium for transportation events by using an integrated computational model. Rather than isolated computational models from other transportation factors, as in conventional systems, the transportation matching system can more flexibly account for an allocation of transportation vehicles or providers in determining proportional premiums—by dynamically generating geospatial-based-proportion metrics using a proportional premium model based on transportation-value metrics from a transportation-rate model. As described further below, in some embodiments, the transportation matching system integrates a transportation-rate model and provider allocation model into determining such geospatial-based-proportion metrics Additionally, in some cases, the transportation matching system further balances allocations of providers to transportation requests and premiums for providers via the use of geocode-specific repositories and regional repositories across geocoded areas. Specifically, the transportation matching system can determine differences in cumulative-events metrics stored in geocode-specific repositories for the geocoded areas and cumulated geospatial-based-proportion metrics for the geocoded areas during the time period. By determining these differences and utilizing the geospatial scores for the transportation events, the transportation matching system can flexibly allocate providers across geocoded areas and/or regions. The transportation matching system can likewise accurately generate and provide proportional premiums to provider devices based on the geospatial-based-proportion metrics to incentive vehicle flow to target geocoded areas for a given time period.

As indicated by the foregoing description, this disclosure uses a variety of terms to describe features and advantages of a transportation matching system. As used herein, the term "region" refers to a spatial division or unit of a larger geographic space. For instance, in some embodiments, a region refers to a city, a collection of cities, or a portion of a city. Such regions may include, for example, Chinatown of San Francisco, California; San Francisco, California; or one or more of the Boroughs of New York City, New York. As described below, a region includes a collection of geocoded areas. Additionally, a region may include sub-regions, such as neighborhoods, each of which can include a set of geocoded areas.

As further used herein, the term "geocoded area" refers to a spatial subdivision or subunit of a region or a larger geographic space. A geocoded area may be a subdivision of a geographic neighborhood as well as a subdivision of a city. As a subdivision, a geocoded area may include a segment of a street, a street, a set of bordering streets, a city block, a set of city blocks, or another portion of an area within a larger geographic space. For example, a set of bordering streets may define a geocoded area within a larger space, such as a set of streets around Times Square in New York City, New York. In certain embodiments, a geocoded area represents a geographic hash ("geohash") in a grid (or other polygon shape) of geohashes within a larger geographic space. Regardless of the form of a geocoded area, one or more requesters and corresponding requester devices or providers and corresponding provider devices may be located within a geocoded area.

As used herein, the term "geospatial-based-proportion metric" refers to a value for a transportation event based on a time and location of the transportation event relative to an area. For example, a geospatial-based-proportion metric can include a numerical value representing a proportional bonus, premium, or reward for a transportation event based on a geospatial score indicating a proximity in time and location of one or more provider devices to a particular geocoded area when the transportation event occurs. A geospatial-based-proportion metric can also be based on additional metrics associated with a geocoded area, such as metrics associated with a geocode-specific repository or a regional repository, as described below.

As used herein, the term "geospatial score" refers to a measurement of a location and a time of a transportation event relative to a geocoded area. In some embodiments, a geospatial score can include a measurement of a geographic distance and a measurement of time between a transportation event and a geocoded area (e.g., a boundary of the geocoded area or a center of the geocoded area). Accordingly, in some cases, a geospatial score can include a measurement of a travel distance between a transportation event and a geocoded area, which can be determined by taking into account the distance of a path that a provider device takes between the transportation event and the geocoded area and/or a travel time between the transportation event and the geocoded area.

As used herein, the term "transportation event" refers to an event that occurs in connection with a request to transport a requester from a first location to a second location. For example, a transportation event can include a pick-up event in which a transportation provider (and corresponding provider device) arrives at a location of a transportation requester to transport the requester to a destination location. Similarly, in some cases, a transportation event can include a drop-off event in which a transportation provider (and corresponding provider device) arrives at a destination location of a transportation requester to drop off the requester. In yet other embodiments, a transportation event can include a particular time or range of times in which a transportation provider (and corresponding transportation vehicle) is transporting a requester, traveling to pick up a requester, or otherwise fulfilling or attempting to fulfill a transportation request.

As used herein, the term "cumulative-events metric" refers to a cumulative value corresponding to transportation events occurring within or around a geocoded area for a time period. In some embodiments, a cumulative-events metric includes a numeric value representing a cumulation of funds or monetary value from transportation events corresponding to a particular geocoded area. To illustrate, the transportation matching system can increment a value of a cumulative-events metric for a geocoded area representing a portion of the value for a transport based on one or more of an accepted transportation request, a pick-up event, an in-transit event or status, or a drop-off event within the geocoded area or through the geocoded area. A cumulative-events metric can accordingly include values from one or both of an unrealized amount of a yet-to-be-completed transport or a realized amount of a completed transport. Thus, the transportation matching system can increment the value of the cumulative-events metric as transportation events occur for a particular transport. Additionally, a cumulative-events metric can be further based on a transportation-value metric for the geocoded area. Accordingly, each geocoded area can be associated with a cumulative-events metric, with each cumulative-events metric being representative (directly or indirectly) of a number of transportation events occurring relative to a specific geocoded area for a period of time.

As used in this disclosure, the term "transportation-value metric" refers to a measurement of efficiency or value for a geocoded area or multiple geocoded areas. For example, in some embodiments, a transportation-value metric refers to (i) a booking metric indicating a quantity of transportation requests projected for receipt from requesters or acceptance by providers in a time period, (ii) a conversion metric indicating a projected quantity or projected rate at which transportation requests result in completed transportation services across geocoded areas in a time period, (iii) a profit metric indicating a projected monetary profit for matching transportation requests to transportation providers across geocoded areas in a time period, or (iv) a revenue metric indicating a projected quantity of revenue for matching transportation requests to transportation providers across geocoded areas in a time period.

Furthermore, as used herein, the term "time period" refers to an interval of time determined or set by a transportation matching system. A time period may be any time interval, including, but not limited to, a one-minute interval or a one-hour interval. For example, a time period may be a one-minute interval from 2:15 p.m. to 2:16 p.m. on Thursday, Jun. 18, 2020. As another example, a time period may be a five-minute interval from 5:00 p.m. to 5:15 p.m. on Sunday, Jun. 21, 2020. In some embodiments, for example, the transportation matching system sets a time period for which to collect, determine, or project data, such as geospatial-based-proportion metrics, location information, price estimates, estimated times of arrival, number of available transportation vehicles, number of projected transportation requests, and other relevant data. In some such embodiments, the transportation matching system collects and organizes the data by time period and geographic area and/or geographic neighborhood.

As used herein, the term "geocode-specific repository" refers to an account or storage for maintaining a cumulative-event metric for a given geocoded area. For instance, a geocode-specific repository can include a storage medium for storing a monetary value based on the transportation events within a geocoded area. Accordingly, a plurality of geocode-specific repositories can include different monetary values based on the transportation events across a plurality of geocoded areas.

In addition, as used herein, the term "regional repository" refers to an account or storage for maintaining a cumulative-reserve metric for a region including a plurality of geocoded areas. For example, a regional repository can include a monetary value used to balance values stored across a plurality of geocode-specific repositories. Accordingly, as used herein, the term "cumulative-reserve metric" refers to a value for balancing cumulative-events metrics across a plurality of geocode-specific repositories based on geospatial-based-proportion metrics generated for the plurality of geocoded areas.

As suggested above, the term "transportation provider" (or simply "provider") refers to a driver or other person who operates a transportation vehicle and/or who interacts with a provider device, on the one hand, or an autonomous vehicle, on the other hand. For instance, a transportation provider includes a person who drives a transportation vehicle along various routes—or an autonomous vehicle that drives along such routes—to pick up and drop off requesters of transportation. Accordingly, an allocation of transportation providers may include an allocation of one or both of human providers driving transportation vehicles and autonomous vehicles across geocoded areas.

Relatedly, the term "provider device" refers to a computing device associated (or used by) a provider or a transportation vehicle. In some embodiments, a provider device includes a provider application comprising instructions that (upon execution) cause the provider device to perform various actions for a transportation matching system, as described herein. Such instructions may likewise cause a provider device to present a graphical user interface identifying one or more premium metrics for one or more target geocoded areas (e.g., within a heatmap).

Additionally, the term "transportation requester" (or simply "requester") refers to person who requests or is projected to request a ride or other form of transportation from a transportation matching system. A requester may refer to a person who requests a ride or other form of transportation but who is still waiting for pick-up. A requester may also refer to a person whom a transportation vehicle has picked up and who is currently riding within the transportation vehicle to a destination (e.g., a destination indicated by a requester). Relatedly, the term "requester device" refers to a computing device associated with (or used by) a requester. In some embodiments, a requester device includes a requester application comprising instructions that (upon execution) cause the requester device to perform various actions for a transportation matching system, as described herein.

Turning now to the figures, FIG. 1 illustrates a schematic diagram of an environment 100 for implementing a transportation matching system 104 in accordance with one or more embodiments. As shown in FIG. 1, the environment 100 includes server(s) 102 comprising the transportation matching system 104, transportation vehicles 108a-108n, provider devices 110a-110n respectively corresponding to the transportation vehicles 108a-108n, requester devices 116a-116n respectively corresponding to requesters 120a-120n, and a network 106. In some embodiments, the transportation vehicles 108a-108n optionally include one or both of providers 114a-114n. The providers 114a-114n in this example are human providers associated with both the transportation vehicles 108a-108n and the provider devices 110a-110n, respectively.

The transportation matching system 104 uses the server(s) 102 to communicate with one or both of the provider devices 110a-110n and the requester devices 116a-116n via the network 106. For example, the transportation matching system 104 communicates with the provider devices 110a-110n and the requester devices 116a-116n via the network 106 to determine locations of the provider devices 110a-110n and the requester devices 116a-116n, respectively. Per device settings, for instance, the transportation matching system 104 may receive location coordinates from the provider devices 110a-110n and/or the requester device 116a-118n, respectively. Based on the location coordinates, the transportation matching system 104 matches or assigns one or more of the transportation vehicles 108a-108n with one or more of the requesters 120a-120n for transportation.

As suggested above, each of the provider devices 110a-110n and the requester devices 116a-116n may comprise a mobile device, such as a laptop, smartphone, or tablet associated with a requester or a provider. The provider devices 110a-110n or the requester devices 116a-116n may be any type of computing device as further explained below with reference to FIG. 9. In some embodiments, one or more of the provider devices 110a-110n are not associated with providers but are attached to (or integrated within) the transportation vehicles 108a-108n, respectively.

As further indicated by FIG. 1, the provider devices 110a-110n include provider applications 112a-112n, respectively. Similarly, the requester devices 116a-116n include requester applications 118a-118n, respectively. In some embodiments, the provider applications 112a-112n (or the requester applications 118a-118n) comprise web browsers, applets, or other software applications (e.g., native applications) respectively available to the provider devices 110a-110n or the requester devices 116a-116n. Additionally, in some instances, the transportation matching system 104 provides data including instructions that, when executed by the provider devices 110a-110n or by the requester devices 116a-116n, respectively create or otherwise integrate one of the provider applications 112a-112n or the requester applications 118a-118n within an application or webpage.

As indicated by FIG. 1, a requester may use a requester application to request transportation services, receive a price estimate for the transportation service, and access other transportation-related services. For example, the requester 120a may interact with the requester device 116a through graphical user interfaces of the requester application 118a to enter a pick-up location and a destination for transportation. The transportation matching system 104 can in turn provide the requester device 116a with a price estimate for the transportation and an estimated time of arrival of a transportation provider through the requester application 118a. Having received the price estimate, the requester 120a may then select (and the requester device 116a detect) a transportation-request option to request transportation services from the transportation matching system 104.

As further depicted in FIG. 1, the transportation matching system 104 sends requests from one or more of the requester devices 116a-116n to one or more of the provider devices 110a-110n within the transportation vehicles 108a-108n, respectively. While FIG. 1 depicts the transportation vehicles 108a-108n as automobiles, a transportation vehicle may also be an airplane, bicycle, motorcycle, scooter, or other vehicle. In some cases, this disclosure describes a transportation vehicle as performing certain functions, but such a transportation vehicle includes an associated provider device that often performs a corresponding function. For example, when the transportation matching system 104 sends a transportation request to the transportation vehicle 108a—or queries location information from the transportation vehicle 108a—the transportation matching system 104 sends the transportation request or location query to the provider device 110a. Accordingly, the transportation vehicle 108a and the provider device 110a are part of a vehicle subsystem.

Although not illustrated in FIG. 1, in some embodiments, the environment 100 may have a different arrangement of components and/or may have a different number or set of components altogether. In certain implementations, for instance, some or all of the transportation vehicles 108a-108n do not include a human provider, but constitute autonomous transportation vehicles—that is, a self-driving vehicle that includes computer components and accompanying sensors for driving without manual-provider input from a human operator. As a further example, in some embodiments, one or more of the transportation vehicles 108a-108n include a hybrid self-driving vehicle with both self-driving functionality and some human operator interaction.

When a transportation vehicle is an autonomous vehicle or a hybrid self-driving vehicle, the transportation vehicle may include additional components not depicted in FIG. 1. Such components may include location components, one or more sensors by which the autonomous vehicle navigates, and/or other components necessary to navigate without a provider (or with minimal interactions with a provider). Regardless of whether a transportation vehicle is associated with a provider, a transportation vehicle optionally includes a locator device, such as a GPS device, that determines the location of the transportation vehicle within the transportation vehicles 108a-108n.

As mentioned above, the transportation vehicles 108a-108n respectively include provider devices 110a-110n separate or integral to the transportation vehicles 108a-108n. Additionally, or alternatively, the provider device 110a may be a subcomponent of a vehicle computing system. Regardless of its form, the provider devices 110a-110n may include various sensors, such as a GPS locator, an inertial measurement unit, an accelerometer, a gyroscope, a magnetometer, and/or other sensors, from which the transportation matching system 104 can access information, such as location information.

In some embodiments, the transportation matching system 104 communicates with the provider devices 110a-110n through the provider applications 112a-112n, respectively. For instance, the provider application 112a can cause the provider device 110a to communicate with the transportation matching system 104 to navigate to a pick-up location to pick up a requester, navigate to a destination location, and/or collect fares. Further, in some cases, the provider application 112a causes the provider device 110a to communicate with the transportation matching system 104 to present a graphical user interface displaying one or more premium metrics based on geospatial-based-proportion metrics for one or more target geocoded areas (e.g., within a heatmap).

Figure 2:
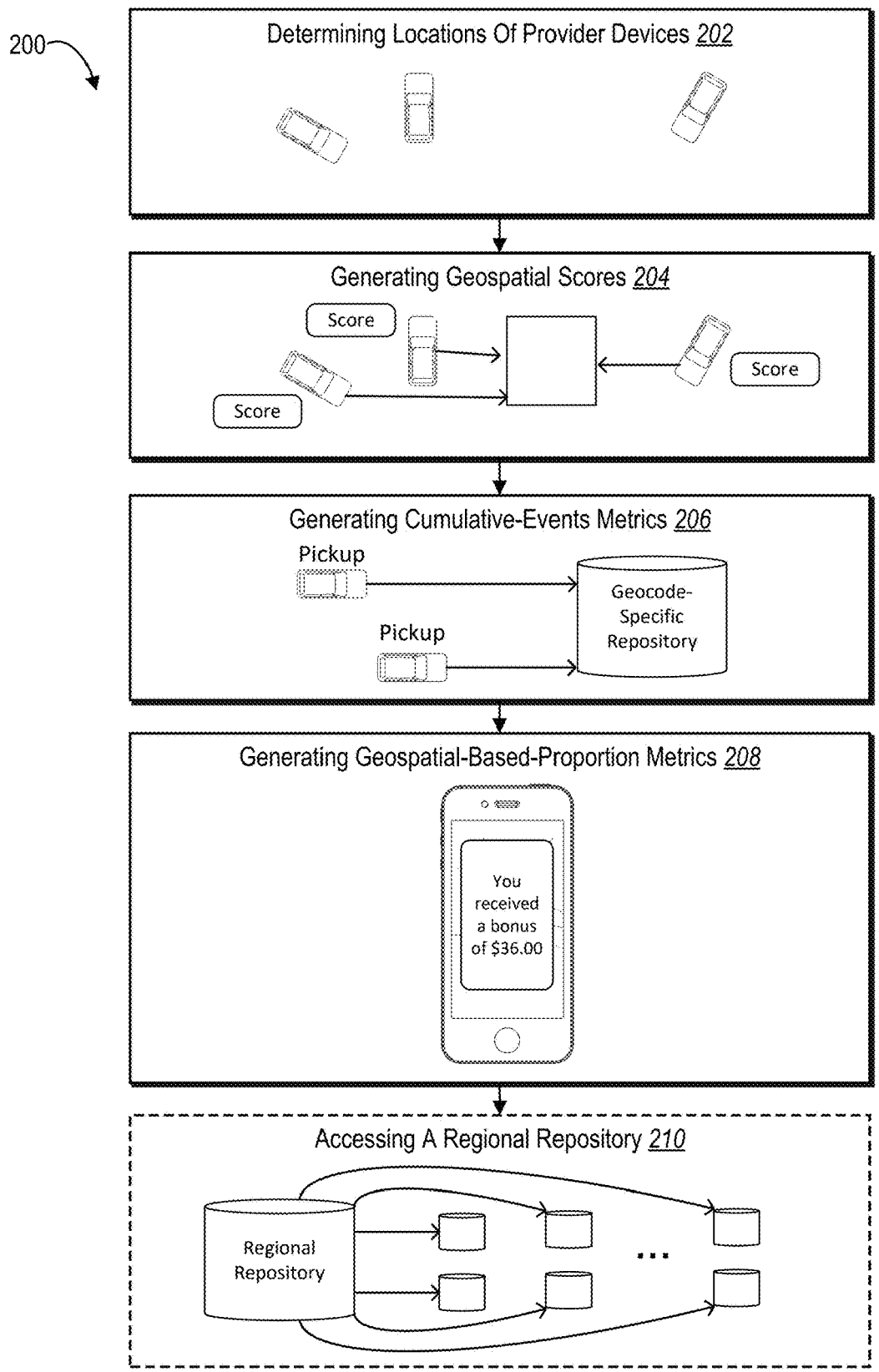
FIG. 2 illustrates a sequence-flow diagram of a transportation matching system generating geospatial-based-proportion metrics for provider devices across geocoded areas for a time period in accordance with one or more embodiments.

As previously mentioned, the transportation matching system 104 can determine locations and geospatial scores for transportation events relative to geocoded areas at a given time period and generate geospatial-based-proportion metrics as proportional premiums for such transportation events. FIG. 2 illustrates a sequence-flow diagram 200 in which the transportation matching system 104 generates geospatial-based-proportion metrics for provider devices across geocoded areas for a time period. Specifically, FIG. 2 illustrates that the transportation matching system 104 uses location data for provider devices across the geocoded areas in connection with geocode-specific and regional repositories to generate the geospatial-based-proportion metrics as premiums for transportation events.

As shown in FIG. 2, for example, the transportation matching system 104 performs an act 202 of determining locations of provider devices. In particular, the transportation matching system 104 can obtain location data from a plurality of provider devices associated with transportation providers. The transportation providers may be registered with the transportation matching system to fulfill transportation requests sent to the transportation matching system 104. Accordingly, in one or more embodiments, the provider devices can provide their respective location data (e.g., GPS data from a GPS device) to the transportation matching system 104 at regular intervals or in response to specific events.

The transportation matching system 104 can utilize the location data from the provider devices to manage positioning of transportation vehicles based on transportation requests. For instance, the transportation matching system 104 can allocate more transportation providers to geocoded areas where demand is higher and fewer transportation providers to geocoded areas where demand is lower. In one or more embodiments, the transportation matching system 104 can allocate providers to geocoded areas based on the present location of each provider device by allocating providers to the closest geocoded areas, respectively. Furthermore, the transportation matching system 104 can allocate transportation providers to geocoded areas based on projections of transportation requests and provider availability across the geocoded areas.

As further shown in FIG. 2, the transportation matching system 104 performs an act 204 of generating geospatial scores for transportation events of provider devices that occur within or near the geocoded areas. Specifically, the transportation matching system 104 can use the location data of provider devices to determine the locations of transportation events (e.g., pick-up events or drop-off events for transportation requests involving the provider devices) relative to the geocoded areas. The transportation matching system 104 can then generate geospatial scores for the identified transportation events based on the relative distances between the transportation events and the geocoded areas. For instance, the transportation matching system 104 can generate a geospatial score for a transportation event involving a provider device based on a travel distance and/or estimated travel time between the location of the provider device and a particular geocoded area at the particular time of the transportation event. The geospatial score can thus indicate a relative proximity (e.g., physical distance, time distance) of a transportation event of a provider device to a given geocoded area for a time period.

The transportation matching system 104 can also generate a plurality of geospatial scores for a transportation event relative to a plurality of geocoded areas. For example, the transportation matching system 104 can generate a plurality of geospatial scores for a transportation event indicating a relative proximity of the transportation event to a plurality of different geocoded areas. Accordingly, the transportation matching system 104 can generate one or more geospatial scores for each transportation event that occurs within or near one or more geocoded areas of a region. In at least some embodiments, the transportation matching system 104 can also generate geospatial scores for transportation events in connection with geocoded areas across more than one region. For instance, if a transportation event occurs in a first geocoded area, the transportation matching system 104 can generate a geospatial score for the transportation event in connection with the first geocoded area and another geospatial score for the transportation event in connection with a second geocoded area in a different region (e.g., an adjacent region).

As further shown in FIG. 2, the transportation matching system 104 performs an act 206 of generating cumulative-events metrics. As indicated above, a cumulative-events metric can include a numeric value representing a cumulation of unrealized or realized funds or monetary value from transportation events corresponding to a particular geocoded area. In some cases, the transportation matching system 104 can generate a cumulative-events metric for a geocoded area for a time period based on the number of transportation requests that occur within the geocoded area. For example, the transportation matching system 104 can determine a geocoded area for each pickup of a requester in response to a transportation request submitted to the transportation matching system 104 by a requester and increment a value of the cumulative-events metric for that geocoded area in response to each pick-up event. As suggested above, the transportation matching system 104 may increment the value of the cumulative-events metric as an unrealized value before completion of a transport corresponding to a pick-up event (or other transportation event) or as a realized value after completion of the transportation corresponding to the pick-up event (or other transportation event). Thus, the cumulative-events metric for each geocoded area is representative of pick-up events or other transportation events within that geocoded area.

For instance, each pick-up event, drop-off event, or other transportation event can contribute a specific proportion of a monetary value to a cumulative-events metric based on an estimated value associated with the corresponding transportation request. To illustrate, in response to a particular pick-up event associated with a transportation request, the transportation matching system 104 can increment the value of the cumulative-events metric according to the monetary value associated with the transportation, where the value may be based on the estimated travel time, distance, and number of requesters transported by a vehicle in the transportation. As can be appreciated, a geocoded area can have different numbers of transportation events with different corresponding monetary values for different time periods. Accordingly, each transportation event can contribute different amounts to a particular cumulative-events metric.

Furthermore, a cumulative-events metric for a geocoded area can be associated with a particular time period. For example, the transportation matching system 104 can increment the value of a cumulative-events metric in response to transportation events that occur within the time period. In some embodiments, the transportation matching system 104 can maintain the value of a separate cumulative-events metric for a geocoded area for each new time period. In other embodiments, the transportation matching system 104 can maintain some or all of a cumulative-events metric from a previous time period for a subsequent time period. For instance, if a transportation requester has not been picked up by a transportation provider after a time period ends, the transportation matching system 104 may carry the corresponding value over from a previous cumulative-events metric to a subsequent cumulative-events metric.

As briefly mentioned previously, the transportation matching system 104 can store a cumulative-events metric for a geocoded area in a geocode-specific repository corresponding to the geocoded area. In one or more embodiments, the geocode-specific repository can maintain the total combined contribution associated with one or more transportation requests as the cumulative-events metric for that geocoded area. Accordingly, each geocoded area can include a separate geocode-specific repository that maintains the corresponding cumulative-events metric corresponding to the geocoded area.

As further shown in FIG. 2, after determining cumulative-events metrics for geocoded areas, the transportation matching system 104 performs an act 208 of generating geospatial-based-proportion metrics. In particular, the transportation matching system 104 can generate geospatial-based-proportion metrics for display at one or more provider devices. To illustrate, the transportation matching system 104 can use one or more cumulative-events metrics from one or more geocoded areas to generate a geospatial-based-proportion metric to send to a provider device. In some embodiments, a geospatial-based-proportion metric is based on a single cumulative-events metric for a single geocoded area, where the single cumulative-events metric is determined according to the proximity of a provider device to a corresponding geocoded area for a time period.

Alternatively, a geospatial-based-proportion metric can be based on a plurality of cumulative-events metrics for a plurality of geocoded areas. For example, the cumulative-events metrics for the plurality of geocoded areas can be based on the proximity of a provider to a plurality of corresponding geocoded areas for a period of time. To illustrate, if a provider device is nearby a plurality of geocoded areas, the provider device can contribute supply (e.g., availability to accept transportation requests) to each of the geocoded areas. The transportation matching system 104 can then generate the geospatial-based-proportion metric using the cumulative-events metric from the geocode-specific repositories according to the proportion of the supply contributed by the provider device to each of the nearby geocoded areas.

As further depicted in FIG. 2, in some embodiments, the transportation matching system 104 can perform an act 210 of accessing a regional repository. Specifically, the transportation matching system utilizes the cumulative-events metrics from one or more geocode-specific repositories to determine a contribution of each geocode-specific repository to a geospatial-based-proportion metric. In at least some instances, the transportation matching system 104 may balance geocode-specific repositories using the regional repository based on the values of the corresponding cumulative-events metrics stored in the geocode-specific repositories.

For instance, if a particular geocode-specific repository does not have a cumulative-events metric with a high enough value to generate a determined geospatial-based-proportion metric, the transportation matching system 104 can access a regional repository to obtain the deficit amount. In particular, the regional repository can include a cumulative-reserve metric that corresponds to a region including the geocoded area(s) used to determine the geospatial-based-proportion metric. The transportation matching system 104 can utilize a portion of the cumulative-reserve metric to make up the deficit from the one or more geocode-specific repositories.

Figure 3A:
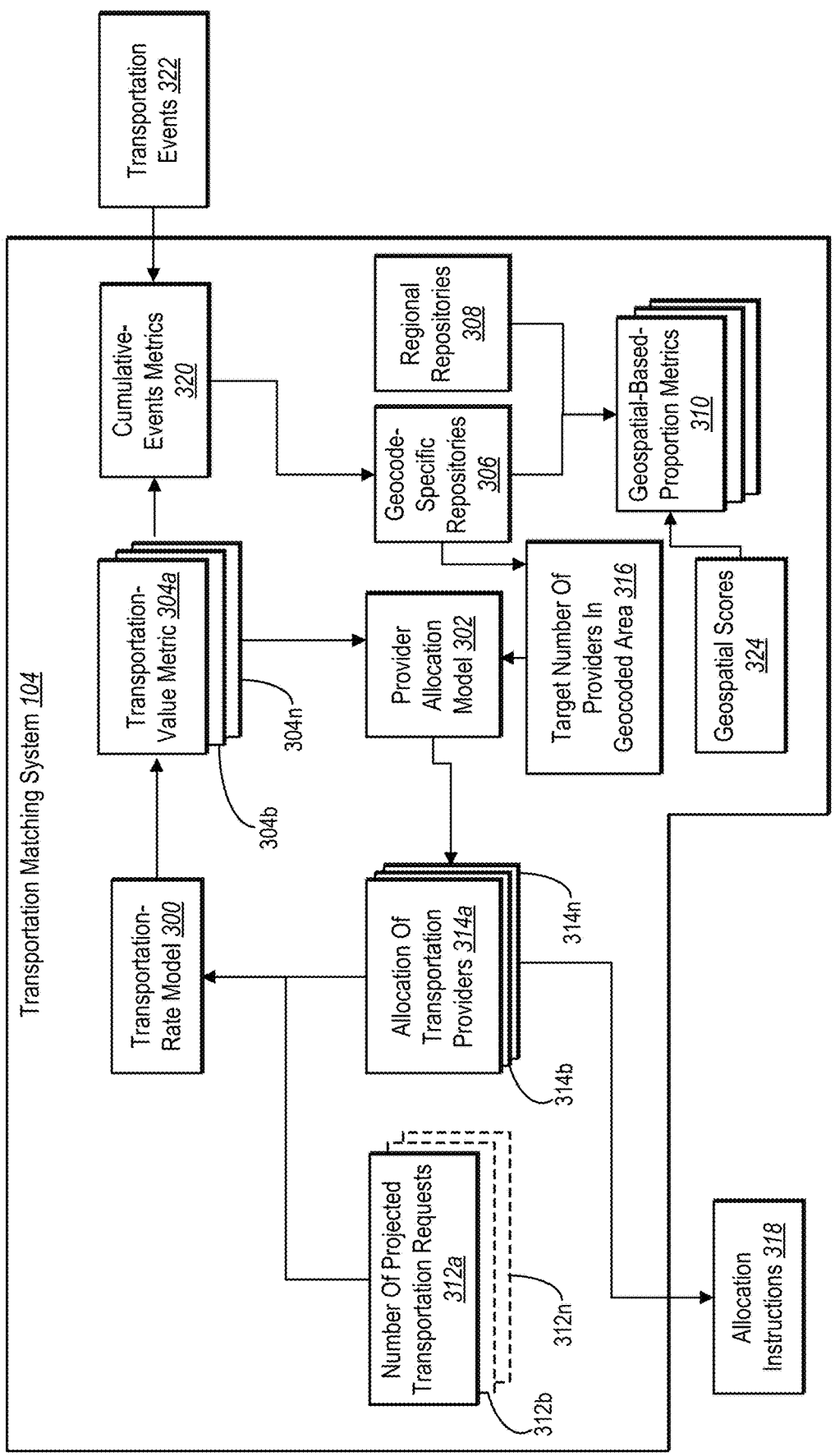
FIG. 3A illustrates a transportation matching system generating geospatial-based-proportion metrics according to the allocation of transportation providers in accordance with one or more embodiments.

As noted above, in some embodiments, the transportation matching system 104 generates geospatial-based-proportion metrics based on an allocation of transportation vehicles across geocoded areas and a transportation-value metric for a geocoded area. Specifically, FIG. 3A illustrates the transportation matching system 104 utilizing a provider allocation model 302 to iteratively adjust allocations of transportation providers across a plurality of geocoded areas and a transportation-rate model 300 to generate transportation-value metrics corresponding to the geocoded areas. FIG. 3A further illustrates that the transportation matching system 104 utilizes the generated transportation-value metrics in conjunction with detected transportation events 322 to generate cumulative-events metrics 320 for storing in geocode-specific repositories 306 corresponding to the geocoded areas. For instance, as mentioned, the transportation matching system 104 can increment the cumulative-events metrics 320 for a particular geocoded area as the transportation matching system 104 cumulates one or both of unrealized amounts and realized amounts for transportation events (i.e., before or after requested transportations are completed). Additionally, FIG. 3A illustrates that the transportation matching system 104 can then utilize the geocode-specific repositories 306 and regional repositories 308 to generate the geospatial-based-proportion metrics 310 for provider devices based on locations of the provider devices relative to the geocoded areas during specific time periods.

As shown in FIG. 3A, the transportation matching system 104 utilizes the transportation-rate model 300 and the provider allocation model 302 to iteratively generate transportation-value metrics $304a$-$304n$ and adjust an allocation of transportation providers $314a$-$314n$ corresponding to geocoded areas for a time period. Specifically, the transportation matching system 104 can use the transportation-rate model 300 to process allocation information from an initial allocation of transportation providers $314a$ (e.g., a projected allocation of providers based on historical data for the geocoded areas)—in addition to numbers of projected transportation requests $312a$-$312n$ across the geocoded areas (e.g., also based on historical data for the geocoded areas)—and generate a transportation-value metric $304a$.

The transportation matching system 104 can then use the provider allocation model 302 to process the transportation-value metric 304a and output a subsequent allocation of transportation providers 314b. The transportation matching system 104 can thus use the transportation-rate model 300 and the provider allocation model 302 to iteratively generate the allocation of transportation providers 314a-314n and the transportation-value metrics 304a-304n subject to one or more constraints. Furthermore, in connection with generating the allocation of transportation providers 314a-314n, the transportation matching system 104 can distribute allocation instructions 318 to provider devices, such as by distributing heatmaps identifying transportation-rate premiums or distributing driving instructions to provider devices.

As further shown in FIG. 3A, upon reaching an iteration threshold (e.g., based on one or more constraints or based on a convergence of the transportation-value metric 304a-304n), the transportation matching system 104 can utilize a transportation-value metric 304n from a final iteration to generate cumulative-events metrics 320 for the geocoded areas. In particular, the transportation matching system 104 can generate the cumulative-events metrics 320 according to transportation events 322 detected for the geocoded areas in combination with the transportation-value metric 304n. As noted, the transportation-value metric 304n can include one of a number of different metrics related to transportation requests across geocoded areas, including a projected quantity of profit or revenue for matching transportation requests to transportation providers across geocoded areas in a time period (e.g., upon completion of service). Thus, the transportation matching system 104 can apply the transportation-value metric 304n to the transportation events 322 detected for the geocoded areas to determine the cumulative-events metrics 320 (e.g., the cumulative monetary value resulting from the transportation events 322) corresponding to the geocoded areas.

FIG. 3A further illustrates that the transportation matching system 104 stores the cumulative-events metrics 320 in geocode-specific repositories 306 corresponding to the geocoded areas. To illustrate, the transportation matching system 104 can store a cumulative-events metric for a geocoded area in a corresponding geocode-specific repository for that geocoded area. The value stored in the geocode-specific repository thus represents a cumulative monetary value of the transportation events occurring within (or near) the geocoded area during a specific time period. The transportation matching system 104 can also continue incrementing a value stored in a geocode-specific repository in response to detecting additional transportation events 322 in (or near) the geocoded area.

As further illustrated by FIG. 3A, the transportation matching system 104 can generate the geospatial-based-proportion metrics 310 to provide to provider devices based on the values stored in the geocode-specific repositories 306. In one or more embodiments, the transportation matching system 104 can generate the geospatial-based-proportion metrics 310 based on the cumulative-events metrics 320 stored in the geocode-specific repositories 306 in connection with geospatial scores 324 for transportation events of provider devices across the geocoded areas. Furthermore, in some embodiments, the transportation matching system 104 can fund or provide missing value to satisfy a geospatial-based proportion metric for one or more provider devices using the regional repositories 308.

As noted, in one or more embodiments, the geospatial-based-proportion metrics 310 serve as proportional premiums for the transportation providers (and corresponding provider devices) performing transportation events relative to geocoded areas. For example, the transportation matching system 104 can generate the geospatial-based-proportion metrics based on the locations and times of transportation events of provider devices across the geocoded areas.

To generate the geospatial-based-proportion metrics, the transportation matching system 104 utilizes cumulative-events metrics 320 corresponding to the geocoded areas. Specifically, as previously described, the cumulative-events metrics 320 for the geocoded areas account for value added by transportation events 322 within the geocoded areas. To illustrate, the transportation matching system 104 increments values of the cumulative-events metrics 320 in response to receiving transportation events 322 across the geocoded areas. In some embodiments, the transportation matching system 104 increments a value of a cumulative-events metric for a geocoded area based on a transportation-value metric from the transportation-rate model 300. The value of the resulting cumulative-events metric can thus increase by an amount dependent on the transportation-value metric in connection with the particular transportation event.

After incrementing a value of a cumulative-events metric for a geocoded area, the transportation matching system 104 can store the cumulative-events metric 320 in a corresponding geocode-specific repository. Each geocode-specific repository can thus store a cumulative-events metric that indicates the number and/or value of the transportation events within respect to a specific geocode area. For instance, geocoded areas that have high numbers of pick-up events, in-transit events, or other transportation events (e.g., high volume areas) can have higher cumulative-events metrics than geocoded areas with geocoded areas with lower numbers of events. Additionally, the cumulative-events metrics 320 can include a number of transportation events associated with transportation requests that span more than one geocoded area. Thus, a pick-up event occurring within a first geocoded area and a drop-off event occurring within a second geocoded area can increment the cumulative-events metrics for the first geocoded area and the second geocoded area.

In one or more embodiments, the transportation matching system 104 utilizes the cumulative-events metrics 320 stored in the geocode-specific repositories 306 to determine the geospatial-based-proportion metrics in conjunction with geospatial scores 324 for transportation events across the geocoded areas. In particular, the transportation matching system 104 can detect transportation events (e.g., pick-up events or other events from the transportation events 322) of provider devices within or near the geocoded areas. The transportation matching system 104 can use locations and a relative time of corresponding provider devices to determine a proximity of the transportation events to the geocoded areas.

Based on the locations, the transportation matching system 104 can generate geospatial scores that include a numerical value representation of the proximity of the transportation events to the geocoded areas. In some embodiments, the transportation matching system 104 uses travel distances and/or travel times to generate the geospatial scores of the transportation events. By generating the geospatial scores based on travel distances/times, the transportation matching system 104 can reward transportation providers for being positioned where the providers are most useful for fulfilling transportation requests in or near the geocoded areas. As explained further below, in some cases, the transportation matching system 104 can generate the geospatial-based-proportion metrics 310 based on a contribution matrix that indicates a contribution proportion of each geocoded area to the geospatial-based-proportion metric for a provider device according to the proportion the provider device contributes to the provider availability pool of the geocoded areas.

Additionally, in one or more embodiments, the transportation matching system 104 can fund or provide missing value to satisfy a geospatial-based-proportion metric for one or more provider devices using the regional repositories 308. For instance, if the difference between the cumulative-events metric for a given geocode-specific repository and the geospatial-based-proportion metrics for the geocoded area and the time period is negative (e.g., indicating a lower value of the cumulative-events metric available than the cumulation of the geospatial-based-proportion metrics), the transportation matching system 104 can utilize a cumulative-reserve metric stored in a corresponding regional repository to make up the difference. The transportation matching system 104 can accordingly generate a proportional premium for each provider device in a geocoded area according to the geospatial-based-proportion metric for each provider device and the cumulative-reserve metric for the corresponding regional repository. Thus, the transportation matching system 104 can utilize the regional repositories 308 to balance the geocode-specific repositories according to the geospatial-based-proportion metrics in each geocoded area of one or more regions.

Furthermore, the transportation matching system 104 can perform a post-computation analysis of the geospatial-based-proportion metrics 310 that minimizes a difference between the geospatial-based-proportion metrics 310 and ideal geospatial-based-proportion metrics given the allocation of transportation providers 314a-314n. In particular, the transportation matching system 104 can minimize the difference between the premiums for each transportation provider with the target premiums were each transportation provider to comply with the allocation-flow matrix. Specifically, as described below, the post-computation analysis can take into consideration the allocation-flow matrix, the compliance probabilities, and the contribution matrix.

In one or more embodiments, the transportation matching system 104 utilizes the transportation-rate model 300 to iteratively determine a transportation-value metric as solving an objective function subject to a plurality of constraints, as follows:

$$\text{Maximize: } 1^T \left( d \circ p \circ (1-r)^{\frac{x}{25}} \right)$$

$$\text{Subject to: } Md \circ p \circ (1-r)^{\frac{x}{25}} \leq \beta_1 (M(s+\bar{s}) - R - \beta_0)$$

$$0 \leq x \leq x^{max}$$

$$s = \left( P_c \circ A + \left( I - \text{diag}((P_c \circ A)^T 1) \right) \right) s_0$$

$$1^T (P_c \circ A) s_0 \geq E^{tgt}$$

$$b^{min} (P_c \circ A) s_0 \leq Ce$$

$$A^T 1 \leq 1, 0 \leq A \leq A^{max}$$

$$C^T 1 \leq 1, 0 \leq C \leq C^{max}$$

As shown above, in some embodiments, the transportation matching system 104 uses an objective function subject to a neighborhood constraint, a transportation-value metric constraint, a provider-allocation model or constraint, a provider-target constraint, a repository constraint, an allocation-matrix constraint, and a contribution-matrix constraint. The following describes each component in turn.

In one or more embodiments, the transportation matching system 104 determines a neighborhood constraint that includes an adjacency-matrix mapping that compares transportation requests and available transportation providers within a geocoded neighborhood. By generating the transportation-value metric subject to the neighborhood constraint, the transportation matching system 104 accounts for the allocation of transportation providers in geocoded areas neighboring the geocoded areas of interest for a given iteration. To further illustrate, in certain implementations, the transportation-rate model 300 determines the neighborhood constraint via the use of a base-conversion metric from a conversion learner, a conversion-reduction metric from the conversion learner, and an allocation-flow matrix indicating transportation providers traveling from initial geocoded areas to target geocoded areas, as described by Davide Crapis et al., Improving Efficiency of a Transportation Matching System Using Geocoded Provider Models, U.S. application Ser. No. 16/125,527 (filed Sep. 7, 2018) (hereinafter "Crapis"), the entire contents of which are incorporated by reference. Further, in certain cases, the transportation-rate model 300 receives the base-conversion metric and the conversion-reduction metric as conversion parameters from a conversion learner, as described by Ricky Chachra et al., Dynamically Generating and Updating Multipliers for a Transportation Matching System Using Machine Learning, U.S. application Ser. No. 15/810,028 (filed Nov. 11, 2017) (hereinafter "Chachra"), the entire contents of which are incorporated by reference.

As shown above, the neighborhood constraint is represented as $$Md \circ p \circ (1-r)^{\frac{x}{25}} \leq \beta_1 (M(s+\bar{s}) - R - \beta_0).$$

In particular, $M \in \mathbb{R}^{n \times n}$ represents an adjacency matrix mapping for comparing demand and supply at a geocoded neighborhood. Additionally, $d, \bar{s} \in \mathbb{R}^n$ represent a number of transportation requests and a number of untreatable (or unavailable) transportation providers for each geocoded area, and $s \in \mathbb{R}^n$ represents the treatable (or available) transportation providers. Furthermore, $p, r \in \mathbb{R}^n$ represent a base-conversion metric and a conversion-reduction metric respectively output by a conversion learner. $\beta_0, \beta_1 \in \mathbb{R}^n$ represent a supply-learner-intercept factor and a slope-learner-slope factor respectively output by a supply learner. Specifically, in some cases, the supply-learner-intercept factor $\beta_0$ represents the net flow of transportation providers into a neighborhood (e.g., a negative value indicates inflow and a positive value indicates outflow), and the slope-learner-slope factor $\beta_1$ represents a transportation provider efficiency, which is determined based on an average number of requests a provider can fulfill. $R \in \mathbb{R}^n$ represents an allocation of reserved transportation providers across the geocoded areas for the time period, where such an allocation is output by a dynamic raw reserve learner and smoothed to a neighborhood level. $x \in \mathbb{R}^n$ represents an initial transportation-value metric.

As shown above, the transportation-value-metric constraint is represented as $0 \leq x \leq x^{max}$. According to one or more embodiments, the transportation-value metric constraint includes a constraint on the transportation-value metric determined by the objective function. Specifically, the transportation matching system 104 can set $x^{max} \in \mathbb{R}_+^n$ as the maximum transportation-value metric, which may be the same throughout a single region, and set the transportation-value metric x to greater than or equal to zero.

As shown above, the provider-allocation model or provider-allocation constraint is represented as $s=(P_c \cdot A+(I-\text{diag}((P_c \cdot A)^T 1)))s_0$. In some cases, the transportation matching system 104 can solve the objective function according to such a provider-allocation model or constraint that allocates transportation providers (e.g., sets the available transportation providers s) across geocoded areas based on an initial value of available transportation providers represented by $s_0 \in \mathbb{R}^n$. Additionally, $A \in \mathbb{R}^{n \times n}$ represents an allocation-flow matrix, where $A_{ij}$ indicates a fraction of available transportation providers allocated to i from j, and $P_c \in \mathbb{R}_+^{n \times n}$ represents a matrix for a compliance probability of transportation providers traveling to or from the geocoded area to one or more target geocoded areas.

As shown above, the provider-target constraint is represented as $1^T(P_c \cdot A)s_0 \geq E^{tgt}$. The transportation matching system 104 can apply such a provider-target constraint to the provider allocation model 302 based on a target number of transportation providers 316. In particular, the transportation matching system 104 determines the allocation of transportation providers to be at least equal to the target number of transportation providers. As described in more detail below, $E^{tgt}$ represents the target number of transportation providers across the geocoded areas.

As further shown above, the repository constraint is represented as $b^{min}(P_c \bullet A)s_0 \leq Ce$. In one or more embodiments, the repository constraint represents a constraint that each geocode-specific repository contributes proportionally to provider devices based on the proportion that each transportation provider contributes availability to each geocoded area. Specifically, $C \in \mathbb{R}^{n \times m}$ constitutes the contribution matrix associated with contribution proportions of the geocode-specific repositories, where $C_{ij}$ represents the fraction of the jth repository to allocate to available transportation providers for the geocoded area j. Additionally, $e \in \mathbb{R}_+^m$ represents a vector of values in geocode-specific repositories and regional repositories, and $b^{min} \in \mathbb{R}_+^n$ represents a minimum premium metric in connection with providing geospatial-based-proportion metrics to provider devices.

As further indicated above, the allocation-matrix constraint is represented as $A^T 1 \leq 1$, $0 \leq A \leq A^{max}$. In one or more embodiments, the allocation-matrix constraint represents a constraint on the allocation of transportation providers across geocoded areas. In particular, $A^{max} \in \mathbb{R}_+^{n \times n}$ represents a constraint on allocations, where $A_{ij}^{max}$ is set to 1 if the geocoded area j is within the neighborhood of geocoded area i, and 0 otherwise.

Finally, the contribution-matrix constraint is represented as $C^T 1 \leq 1$, $0 \leq C \leq C^{max}$ above. The contribution-matrix constraint includes a constraint that establishes a maximum contribution in value of each geocode-specific repository to provider devices. Specifically, $C^{max} \in \mathbb{R}_+^{n \times m}$ represents a cap of repository contributions, where $C_{ij}^{max}$ is set to 1 if j is a regional repository or a geocode-specific repository close enough to the geocoded area i and 0 otherwise to meet the minimum bonus (e.g., a minimum premium metric).

As noted above, the transportation matching system 104 can utilize a target number of transportation providers across geocoded areas to solve the objective function. In one or more embodiments, to determine the target number of transportation providers, the transportation matching system 104 can utilize historical data for transportation providers complying with allocations of transportation providers across geocoded areas. For example, in one or more embodiments, the transportation matching system 104 determines the probability of transportation providers complying with allocations or premiums to travel to specific geocoded areas (e.g., based on the ability of transportation providers to comply due to one or more factors). The transportation matching system 104 can determine the target number of transportation providers based on a projected number of transportation providers that will be fulfilling transportation requests in the geocoded areas for the time period. Additionally, the transportation matching system 104 can determine the target number of transportation providers according to an initial number of transportation providers (e.g., provider devices) positioned within the geocoded areas.

The transportation matching system 104 can also utilize data associated with a corresponding geocode-specific repository (e.g., from the geocode-specific repositories 306) to determine the target number of transportation providers across the geocoded areas. For instance, as noted previously, the data stored in the geocode-specific repositories 306 for the geocoded areas can be based on the transportation events in each geocoded area. Furthermore, the transportation matching system 104 can determine weights indicating the contribution of each geocode-specific repository to each transportation provider for a given geocoded area. The transportation matching system 104 can then determine the target number of transportation providers 316 based on such data to use as a benchmark number of transportation providers to receive premiums for determining an allocation-flow matrix.

For example, according to one or more embodiments, the transportation matching system 104 can determine the target number of transportation providers $E^{tgt}$ as:

$$E^{tgt} = \Sigma_{i=\mathcal{G}} P_{c,ii} s_{0,i} 1\{w_i(s_0)^T e \geq b^{min}\},$$

in which $\mathcal{G}$ represents a set of geocoded areas in a region with $|\mathcal{G}|=n$. Additionally, $s_{0,i} \in \mathbb{R}_+$ represents the initial number of available transportation providers in the ith geocoded area. $P_{c,ii} \in \mathbb{R}_+$ represents a compliance probability of transportation providers traveling from an initial geocoded area i to a target geocoded area i. Furthermore, $e \in \mathbb{R}_+^n$ represents a vector of non-negative values for geocode-specific repositories and a regional repository for a corresponding region. Additionally, $w_i(s_0)$ represents a function dependent on the vector of initially available transportation providers that produces a vector of weights in $\mathbb{R}_+^n$ and that indicate the contribution of each geocode-specific repository to each individual transportation provider in the ith geocoded area. Also, $b^{min}$ represents a minimum premium metric (or value for a bonus).

In some embodiments, the transportation matching system 104 can determine the target number of transportation providers $E^{tgt}$ as:

$$E^{tgt} = \sum_{i=\mathcal{G}} P_{c,ii} s_{0,i} \left(\frac{w_i(s_0)^T e}{b^{min}}\right)_{[0,1]} 1\left\{s_{0,i} \frac{w_i(s_0)^T e}{b^{min}} \geq 1\right\},$$

By determining the target number of transportation providers $E^{tgt}$ as set forth above, the transportation matching system 120 can account for a large concentration of transportation providers is located within the same geocoded area.

In one or more embodiments, the transportation matching system 104 determines whether the net contribution of the values in the geocode-specific repositories to each individual provider device in a particular geocoded area is high enough to meet a minimum value of premium metrics. The transportation matching system 104 can use the weights to balance the contribution of the geocode-specific repositories to the transportation providers. Additionally, in one or more embodiments, the transportation matching system 104 can generate the weights in a way that optimizes the number of transportation providers (and corresponding provider devices) to which the transportation matching system 104 provides geospatial-based-proportion metrics (e.g., the geospatial-based-proportion metrics 310).

As described above, the transportation matching system 104 uses an objective function that is modified from an objective function for allocating transportation providers across geocoded areas as described by Hao Yi Ong et al., Dynamically Generating and Updating an Allocation of Transportation Providers Across Geocoded Areas, in U.S. application Ser. No. 16/539,965 (filed Aug. 13, 2019) (hereinafter "Ong"), the entire contents of which are incorporated by reference.

In one or more embodiments, the transportation matching system 104 can account for solutions to the objective function that may result in no allocation of a premium for a particular transportation provider. Specifically, in cases in which a transportation provider (and corresponding provider device) is already located in a geocoded area according to an allocation-flow matrix or an allocation of transportation providers, the transportation matching system 104 can utilize a supply variable that biases the objective function towards allocating a premium. For example, the supply or number of available transportation providers can be represented as:

$$s(P_c \cdot A + (1-\epsilon)(I - \text{diag}((P_c \cdot A)^T 1)))s_0$$

where $\epsilon$ is an arbitrary, small number that is larger than a numerical tolerance of the solver. The presence of a nonzero value in the allocation-flow matrix increases the value of s, since the objective pushes allocation in that direction.

As described above, the transportation matching system 104 can perform a post-computation analysis of the geospatial-based proportion metrics 310 to minimize a difference between the geospatial-based proportion metrics 310 and ideal geospatial-based-proportion metrics. Specifically, the transportation matching system 104 can minimize a function involving a premium metric and an ideal premium metric subject to a plurality of constraints:

Minimize: $\|b - b^{tgt}\|_2^2$

Subject to: $\text{diag}((P_c \cdot A^*)s_0)b \leq Ce$ $b^{min} \leq b \leq b^{max}$ $C^T 1 \leq 1, 0 \leq C \leq C^{max}$ As shown above, in some embodiments, the transportation matching system 104 minimizes the function subject to a repository-balance constraint, a premium constraint, and the contribution-matrix constraint. The contribution-matrix constraint is described above with the objective function of the transportation-rate model 300.

As shown above, the repository-balance constraint is represented as $\text{diag}((P_c \cdot A^*)s_0)b \leq Ce$. In one or more embodiments, the transportation matching system 104 utilizes the repository-balance constraint to generate premium metrics that correspond to the values stored in the geocode-specific repositories. For example, the post-computation results in matching the premium metrics according to the contribution matrix based on an assumption that transportation providers allocated to specific geocoded areas comply with the allocations. In particular, $b \in \mathbb{R}^n$ represents the premium metric output by the transportation matching system 104, and $b^{tgt} \in \mathbb{R}_+^n$ represents the target smoothed premium metric given the allocation of transportation providers $A^* \in \mathbb{R}_+^{n \times m}$ previously determined according to the provider allocation model 302.

As further shown above, the premium constraint is represented as $b^{min} \leq b \leq b^{max}$. The premium constraint limits the value of the premium metric b between a minimum and a maximum. As previously noted, $b^{min} \in \mathbb{R}_+^n$ represents the minimum premium metric, and $b^{max} \in \mathbb{R}_+^n$ represents the maximum premium metric.

Figure 3B:
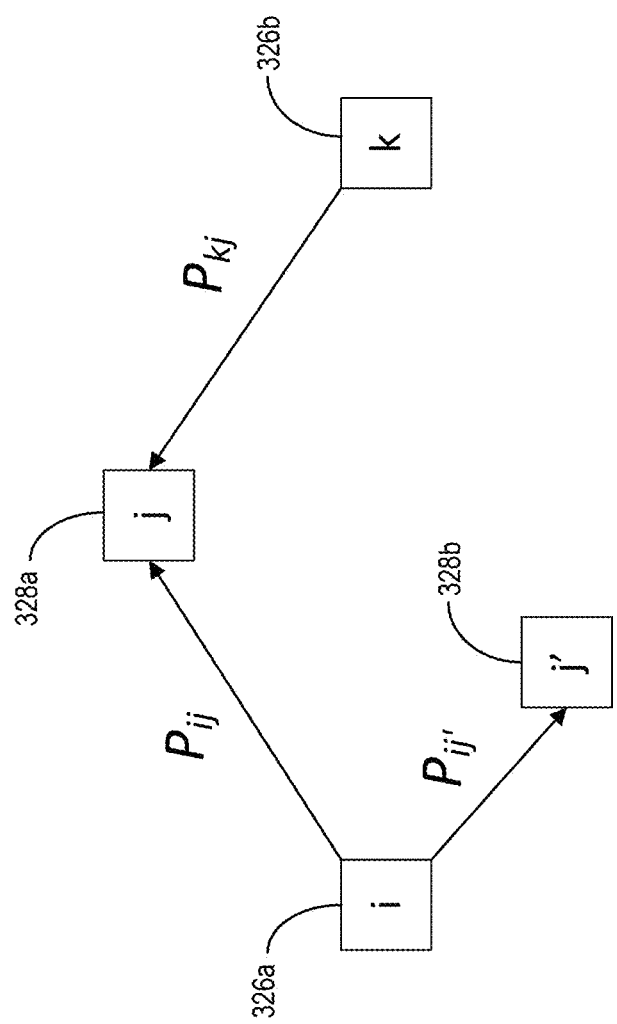
FIG. 3B illustrates a diagram indicating supply allocation contributions across neighboring geocoded areas in accordance with one or more embodiments.

FIG. 3B illustrates an example of contribution proportions of transportation providers to supply in neighboring geocoded areas (e.g., for determining values of a contribution matrix). Specifically, FIG. 3B illustrates a first geocoded area 326*a* and a second geocoded area 326*b* that contribute at least some proportion of their supply pools or available transportation providers to neighboring geocoded areas-a third geocoded area 328*a* and a fourth geocoded area 328*b*. For example, in one or more embodiments, the third geocoded area 328*a* and the fourth geocoded area 328*b* are associated with geocode-specific repositories that have a positive value. The third geocoded area 328*a* and the fourth geocoded area 328*b* may have repositories of positive values based on transportation requests occurring within the third geocoded area 328*a* and the fourth geocoded area 328*b*).

As shown in FIG. 3B, the first geocoded area 326*a* includes one or more transportation providers that contribute at least some proportion of their available transportation providers to the third geocoded area 328*a* and the fourth geocoded area 328*b*. The first geocoded area 326*a* may contribute to the third geocoded area 328*a* and the fourth geocoded area 328*b* based on a proximity (e.g., travel distance/time) to the neighboring geocoded areas. FIG. 3B also shows that the second geocoded area 326*b* includes one or more transportation providers that contribute at least some proportion of available transportation providers to the third geocoded area 328*a*. In contrast to the first geocoded area 326*a*, the second geocoded area 326*b* does not contribute any portion of its available transportation providers to the fourth geocoded area 328*b*.

In one or more embodiments, the transportation matching system 104 determines an estimated-time-of-arrival ("ETA")—based on an exponential smoothing function to apply to each transportation provider in a geocoded area i to determine its contribution to the pool of available transportation providers to each neighboring geocoded area j. For example, the transportation matching system 104 can determine ETA based on historic traffic information, speed limits, and road distance to determine the travel distance. In particular, the smoothing function can be represented as:

$$P_{ij} = \frac{\exp(-\alpha t^{ETA}(i,j))}{\sum_{k \in nbh(i,\mathcal{G})} \exp(-\alpha t^{ETA}(i,k))}$$

where $\alpha$ is a contribution decay constant, $t^{ETA}(i, j)$ represents the ETA from geocoded area i to geocoded area j, and $nbh(i, \mathcal{G})$ returns the neighboring geocoded areas of the input geocoded area i from $\mathcal{G}$. According to some embodiments, these values are fixed with respect to the ETAs. The transportation matching system 104 can precompute and cache the values to avoid the computational overhead associated with computing these values each time the transportation matching system 104 generates the geospatial-based-proportion metrics 310.

The transportation matching system 104 can further determine a weighting matrix representing contributions to proportional premiums for a plurality of transportation providers. More specifically, in one or more embodiments, the weighting matrix is represented as:

$$W = \begin{bmatrix} w_1^T \\ \vdots \\ w_n^T \end{bmatrix}$$

such that each entry $W_{ij}$ represents the contribution to the geospatial-based-proportion metric for each transportation provider in geocoded area i from the geocode-specific repository for geocoded area j. According to the supply contribution function above, the weights can further be represented as:

$$W_{ij} = \frac{P_{ij}}{\sum_{k \in nbh(i,\mathcal{G})} P_{kj} s_{0,k}}.$$

Accordingly, the contribution to the geocode-specific repository of geocoded area i from the geocode-specific repository of geocoded area j is the same as the proportional contribution of an individual transportation provider in geocoded area i to the supply pool (or available transportation providers) of geocoded area j compared to other transportation providers in the neighborhood of geocoded area j.

Using the contribution matrix and weighting parameters described above, the transportation matching system 104 can minimize the proportional premiums for transportation providers based on a target premium metric. Specifically, the transportation matching system 104 first determines the target premium metric based on the weighting parameters above in conjunction with the optimal allocation-flow matrix and values in the geocode-specific and regional repositories for a set of geocoded areas. In one or more embodiments, the transportation matching system 104 determines the target premium metric $b^{tgt}$ by recomputing the weights W with each entry defined based on the optimal allocation A* (and multiplied by vector e representing non-negative values for geocode-specific repositories and a regional repository for a corresponding region):

$$W_{ij} = \frac{P_{ij}}{\sum_{k \in nbh(i,\mathcal{G})} P_{kj}((P_C \circ A^*)s_0)_k}.$$

Additionally, in one or more embodiments, the transportation matching system 104 may record an optimal expected premium metric b* and repository contribution B*. The transportation matching system 104 can use the expected premium metric to generate a premium range and accumulation rates. The transportation matching system 104 can use the repository contribution to manage accounting purposes in disbursing premiums when providing the proportional premiums to transportation providers according to geospatial-based-proportion metrics.

Furthermore, in one or more embodiments, the transportation matching system 104 can perform the post-computation analysis subject to one or more constraints. For example, the transportation matching system 104 can use a modified repository constraint as follows:

$$\mathrm{diag}((P_c \cdot A^*)s_0)b \lessapprox Ce$$

where the right-hand side determines the contribution of each geocode-specific repository to the premium based on each geospatial-based-proportion metric. In other words, the ith element $$(Ce)_i = \sum_{k=1}^{m} C_{ik} e_k$$

determines the allocation amount to provide proportional premiums to provider devices of transportation providers for performing transportation events relative to geocoded area i. The proportion of the contribution from the geocode-specific repository for transportation providers from geocoded area j to perform transportation events relative to geocoded area i is thus:

$$\frac{c_{ij} e_k}{(Ce)_j}.$$

According to one or more embodiments, the transportation matching system 104 can emit a dictionary of the identifiers for the geocode-specific repositories and their contribution fractions/percentages to each heatmap for a template instead of the actual expected contribution in monetary value. The transportation matching system 104 can thus standardize the template and sum to unity so that the transportation matching system 104 can refer to the template contributions and convert an earnings state to an actual expected contribution in monetary value when providing premiums to provider devices.

Figure 4A:
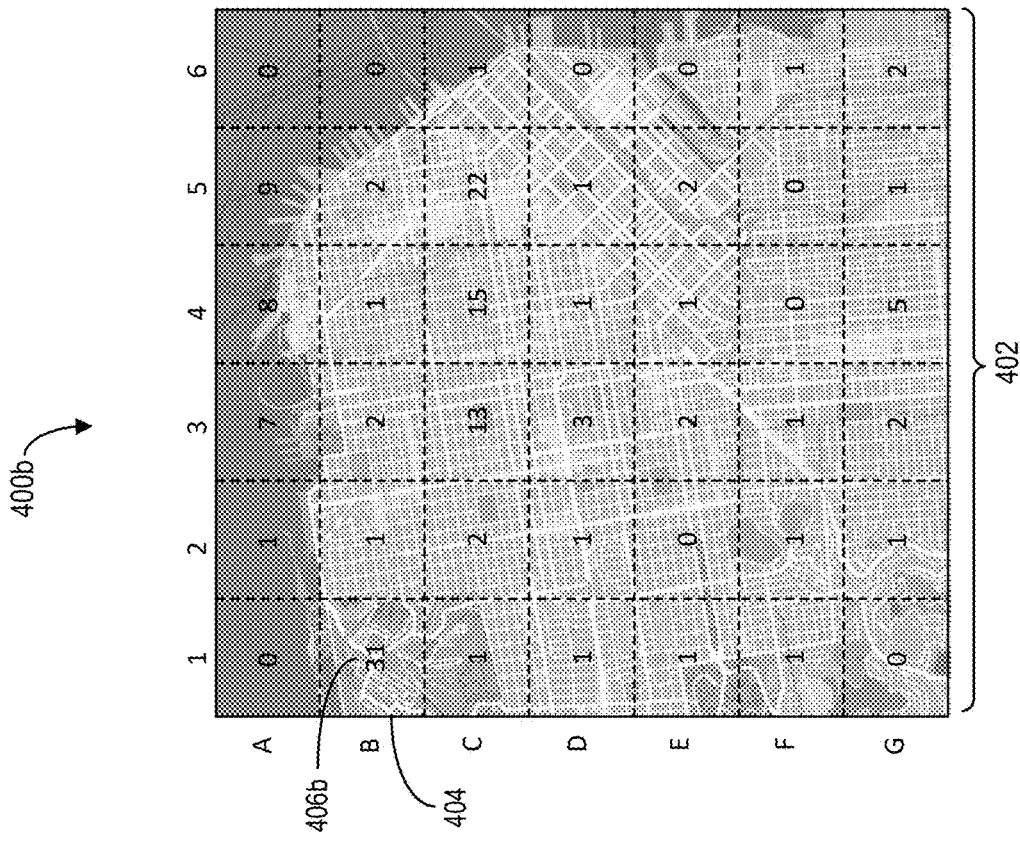
FIG. 4A illustrates an allocation of transportation providers across geocoded areas in accordance with one or more embodiments.
Figure 4B:
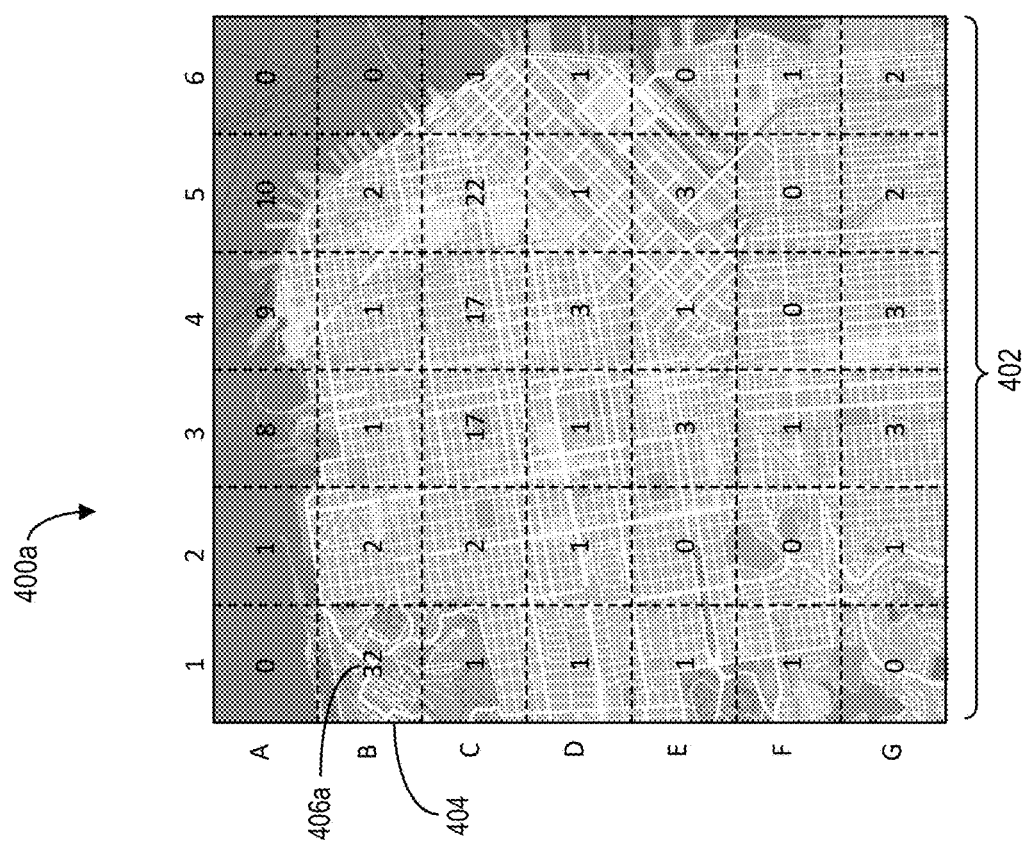
FIG. 4B illustrates cumulations of transportation events across geocoded areas in accordance with one or more embodiments.

As mentioned, the transportation matching system 104 can generate an allocation of transportation providers across geocoded areas for a time period and generate geospatial-based-proportion metrics for transportation providers performing transportation events relative to geocoded areas. In particular, the transportation matching system 104 can utilize a plurality of matrices to represent data associated with allocating transportation providers and providing premiums to provider devices. FIGS. 4A-4B illustrate a plurality of matrices associated with a plurality of geocoded areas of a region and transportation-provider allocations and transportation events across the geocoded areas, respectively.

As described previously, the transportation matching system can also utilize an iterative process to allocate transportation providers across geocoded areas. FIG. 4B illustrates an allocation matrix 400a overlaid on top of a map of a region 402 to represent an allocation of transportation providers across geocoded areas within the region 402. For illustrative purposes, FIG. 4A depicts the allocation matrix 400a over a map representing geocoded areas for the region 402 based on estimated numbers of transportation requests within the geocoded areas. In one or more embodiments, the allocation matrix 400a can include values arranged in rows and columns, where each value indicates a number of transportation providers for a particular geocoded area. As indicated by FIG. 4A, the allocation matrix 400a includes a number of transportation providers for each geocoded area within the region 402. A geocoded area 404, for example, corresponds to a number of transportation providers 406a.

FIG. 4B illustrates a graphical representation of an event matrix 400b including detected transportation events across the geocoded areas of the region 402 for a particular time period. As shown, the event matrix 400b includes a number of transportation events that the transportation matching system 104 detects within each geocoded area of the region 402 for the time period. For instance, in response to detecting that a transportation provider has performed a pick-up event (e.g., by picking up a requester with a transportation vehicle in connection with a transportation request), the transportation matching system 104 can increment a value stored in a corresponding cell of the event matrix 400*b*. To illustrate, the event matrix 400*b* of FIG. 4B includes a number of transportation events 406*b* for the geocoded area 404 based on the detected events for the geocoded area 404. As shown, the number of transportation events for each geocoded area may be different than the corresponding number of transportation providers based on the allocation matrix.

Additionally, the transportation matching system 104 can utilize the event matrix 400*b* to generate cumulative-events metrics for the geocoded areas. For instance, for each transportation event within a geocoded area, the transportation matching system 104 can increment a value of the corresponding cumulative-events metric for the geocoded area. Additionally, by incrementing the values of the cumulative-events metrics based on transportation events within the geocoded areas, the transportation matching system 104 modifies the value of the cumulative-events metrics stored in the corresponding geocode-specific repositories.

As shown by FIGS. 4A-4B, the number of transportation providers and the number of transportation events for a geocoded area for a time period may not be the same. For example, the allocation of transportation providers can be based on an estimated number of requests within the geocoded area, which may be different than the number of transportation events that occur within the same time period. Furthermore, each transportation request may be associated with a plurality of transportation events that occur within different geocoded areas, resulting in further differences between the allocation matrix 400*a* and the event matrix 400*b*.

As mentioned, the transportation matching system 104 uses the geocode-specific repositories to generate the geospatial-based-proportion metrics for providing to provider devices across the geocoded areas. Because of the differences, the transportation matching system 104 utilizes the geocode-specific repositories in connection with a regional repository associated with the region 402 to manage the balances of the repositories. For instance, if the number of transportation events in the geocoded area 404 is larger than the number of transportation requests, the transportation matching system 104 can utilize the regional repository to fund premiums based on the geospatial-based-proportion metrics for the provider devices in the geocoded area 404.

Figure 5A:
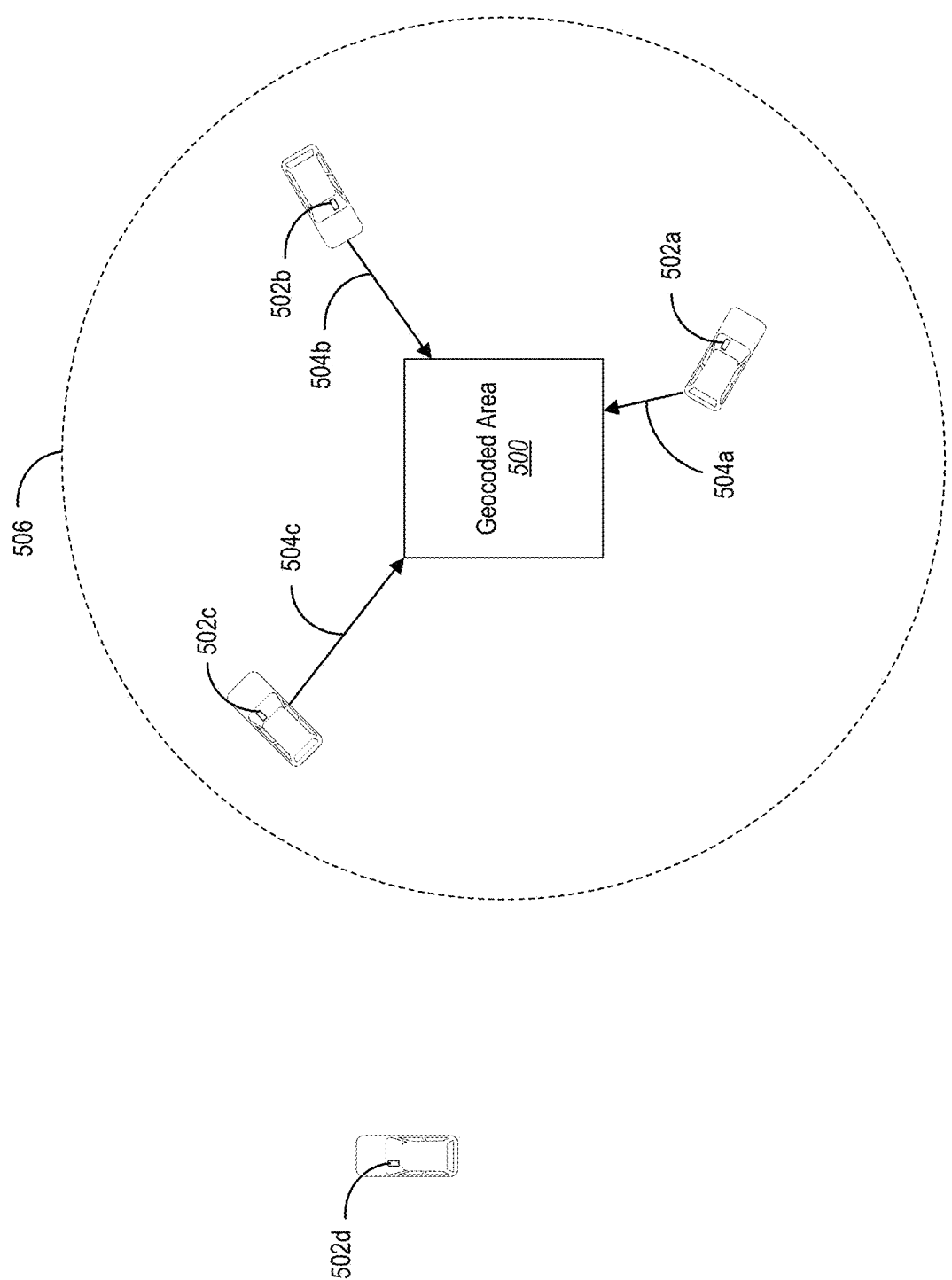

FIGS. 5A-5B illustrate examples of the transportation matching system 104 determining geospatial scores and geospatial-based-proportion metrics for transportation providers relative to a geocoded area 500. Specifically, FIG. 5A illustrates a first positioning of provider devices 502*a*-502*d* (within corresponding vehicles) relative to the geocoded area 500. FIG. 5B illustrates a second positioning of the provider devices 502*a*-502*d* relative to the geocoded area 500.

In one or more embodiments, as shown in FIG. 5A, a first provider device 502*a* associated with a first transportation provider can be positioned at a first distance 504*a* away from the geocoded area 500. Similarly, a second provider device 502*b* associated with a second transportation provider can be positioned a second distance 504*b* away from the geocoded area 500, and a third provider device 502*c* associated with a third transportation provider can be positioned a third distance 504*c* away from the geocoded area 500. As described previously, the transportation matching system 104 can determine the distances of each provider device away from the geocoded area 500 based on an estimated travel time for the provider device to travel to the geocoded area in connection with transportation events involving the provider devices. For example, the transportation matching system 104 can determine the locations of the provider devices in connection with pick-up events, drop-off events, or other transportation events involving the provider devices at a specific time (or during a specific time period).

As FIG. 5A also shows, the transportation matching system 104 can determine that the first provider device 502*a*, the second provider device 502*b*, and the third provider device 502*c* are within a predetermined distance 506 of the geocoded area 500. In various embodiments, the predetermined distance 506 may be a predetermined geographical distance (e.g., a radius surrounding the geocoded area 500) or a travel time distance (e.g., ETA distance from a boundary of the geocoded area). Additionally, the transportation matching system 104 can determine that a fourth provider device 502*d* is not within the predetermined distance 506. Accordingly, the transportation matching system 104 can determine that the first provider device 502*a*, the second provider device 502*b*, and the third provider device 502*c* contribute to the transportation provider availability of the geocoded area 500 based on their respective proximity to the geocoded area 500, while the fourth provider device 502*d* does not contribute to the transportation provider availability of the geocoded area 500.

In response to determining the locations and the relative times (e.g., ETA distances) of the transportation events involving the provider devices relative to the geocoded area 500, the transportation matching system 104 can generate geospatial scores for the transportation events. Specifically, as previously described, the geospatial scores indicate the relative locations and times of the transportation events with respect to the geocoded area 500. Accordingly, the geospatial scores also correspond to the provider devices involved in the transportation events with respect to the geocoded area 500.

Furthermore, as described previously, the transportation matching system 104 can generate geospatial-based-proportion metrics for provider devices based on the proportion that each provider device contributes to the availability of transportation providers for each geocoded area. For example, the transportation matching system 104 can generate the geospatial-based-proportion metrics for the first provider device 502*a*, the second provider device 502*b*, and the third provider device 502*c* in connection with the geocoded area 500 based on the proportion that each provider device contributes to the transportation provider availability of the geocoded area 500 based on the geospatial scores of the corresponding transportation events. Additionally, because the fourth provider device 502*d* does not contribute to the supply pool of the geocoded area 500 (e.g., based on being outside the predetermined distance 506), the transportation matching system 104 may not generate a geospatial-based-proportion metric for the fourth provider device 502*d*.

In one or more embodiments, the transportation matching system 104 can induce transportation providers to travel to specific geocoded areas by sending instructions (e.g., in the form of a heatmap) to provider devices to travel to the geocoded areas. For example, if the geocode-specific repository for the geocoded area 500 has a positive value (e.g., indicating transportation demand in the geocoded area 500), the transportation matching system 104 can determine that additional transportation providers should travel to the geocoded area 500. As reflected by the fourth provider device 502d relocating in FIG. 5B, the transportation matching system 104 provides such instructions to the fourth provider device 502d for the transportation provider associated with the fourth provider device 502d to travel to the geocoded area 500.

If the transportation provider associated with the fourth provider device 502d complies with the instructions to travel to the geocoded area 500 for the time period, the fourth provider device 502d contributes to the transportation provider availability of the geocoded area 500 based on the updated proximity of the fourth provider device 502d to the geocoded area 500. In response to the fourth provider device 502d entering the neighborhood of the geocoded area 500 (e.g., entering the predetermined distance 506), the transportation matching system 104 can determine different geospatial-based-proportion metrics based on the inclusion of the fourth provider device 502d in the supply pool. To illustrate, because the proximity of the fourth provider device 502d to the geocoded area 500 contributes to the transportation provider availability of the geocoded area 500, the transportation matching system 104 also includes the fourth provider device 502d in calculating the geospatial-based-proportion metrics. Specifically, the transportation matching system 104 can divide the available value stored in the geocode-specific repository proportionally based on the inclusion of the first provider device 502a, the second provider device 502b, the third provider device 502c, and the fourth provider device 502d within the neighborhood of the geocoded area 500.

Based on the relative positions of the provider devices in FIGS. 5A-5B, the geocode-specific repository associated with the geocoded area 500 contributes to geospatial-based-proportion metrics based on the distance (e.g., ETA) of each provider device from the geocoded area 500. In particular, because each geocoded area in a region is associated with a separate geocode-specific repository, the corresponding geocode-specific repository of each geocoded area can also contribution to geospatial-based-proportion metrics for provider devices based on the proximity of the provider devices to the geocoded area. Accordingly, the transportation matching system 104 can utilize a contribution matrix, as described previously, to determine a portion that the geocode-specific repository of each geocoded area contributes to geospatial-based-proportion metrics of provider devices within their respective neighborhoods.

In one or more embodiments, the transportation matching system 104 determines a time period for generating the geospatial-based-proportion metrics according to predefined periods of time. For example, the transportation matching system 104 can establish each time period in one-minute time windows or two-minute time windows. Alternatively, the time periods can be longer, such as 15-minute time windows.

The transportation matching system 104 can thus detect transportation events that occur within a given time period for generating geospatial-based-proportion metrics. For instance, for each pick-up, drop-off, or other transportation event made within a geocoded area during the time period, the transportation matching system 104 can increment a value of a cumulative-events metric stored in a corresponding geocode-specific repository. Additionally, for each transportation event of a provider device that occurs within the geocoded area during the time period, the transportation matching system 104 can generate a geospatial score to use in generating a geospatial-based-proportion metric for the provider device.

In one or more embodiments, a transportation event may refer to a single specific event, such as a pick-up event. In some embodiments, a transportation event may include more than one type of event such as pick-up events, drop-off events, or incremental location measurements in connection with completion of a transportation request. This may allow the transportation matching system 104 to generate geospatial-based-proportion metrics for provider devices based on transportation providers entering or nearing a geocoded area to pick up or drop off a requester, or to travel through the geocoded area on the way to dropping off the requester. Additionally, a geospatial-based-proportion metric (or cumulation of geospatial-based-proportion metrics) can be based on a plurality of transportation events associated with a single provider device, such that a transportation provider may receive a proportional premium based on more than one transportation event during a single transportation request. For instance, a transportation provider (e.g., the first transportation provider associated with the first provider device 502a) may receive a proportional premium based on being in the neighborhood of the geocoded area 500 when picking up a requester and an additional proportional premium based on being in a neighborhood of a different geocoded area when dropping off the requester.

Figure 6C:
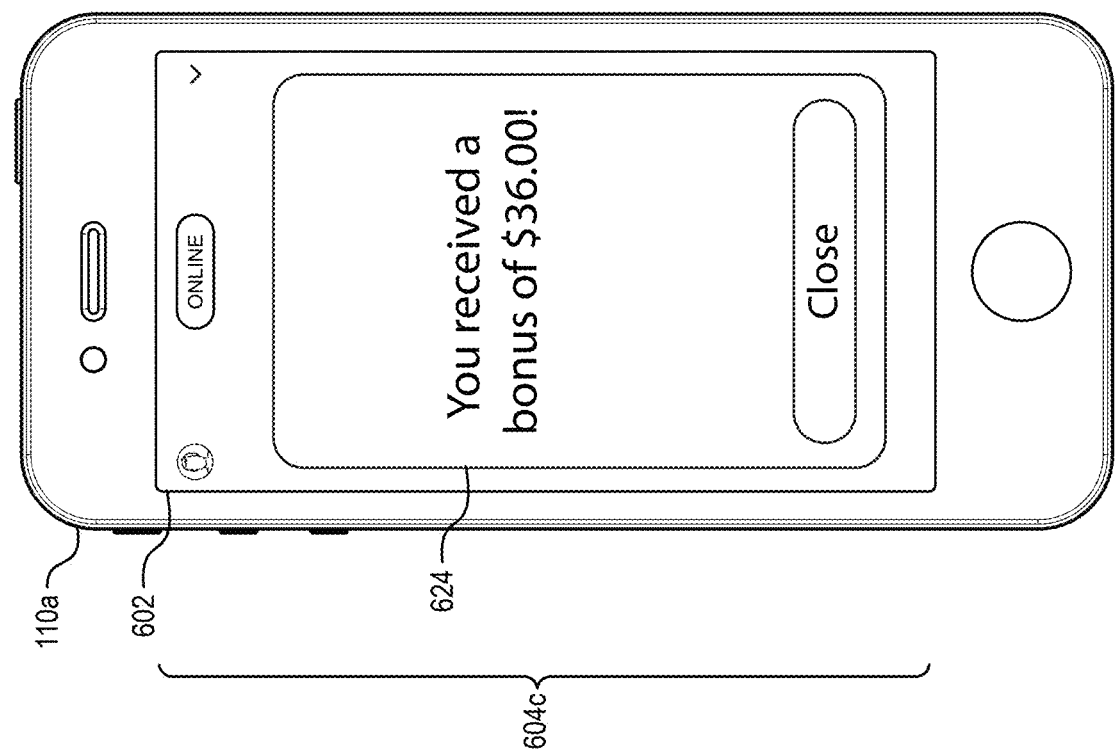

As noted above, the transportation matching system 104 can distribute instructions associated with an allocation of transportation providers to one or more provider devices. In some cases, the transportation matching system 104 sends instructions to a provider device that (upon execution) cause the provider device to present a graphical user interface identifying one or more premiums for one or more target geocoded areas. In accordance with one or more embodiments, FIGS. 6A-6C depict a provider device presenting graphical user interfaces notifying a provider of (or identifying) a provider-rate premium for target geocoded areas and a subsequent geospatial-based-proportion metric for complying with the instructions. As an overview, FIGS. 6A-6C each depict the provider device 110a of FIG. 1 comprising the provider application 112a for the transportation matching system 104. The provider application 112a comprises computer-executable instructions that cause the provider device 110a to perform certain actions depicted in FIGS. 6A-6C.

Rather than repeatedly describe the computer-executable instructions within the provider application 112a as causing the provider device 110a to perform such actions, this disclosure primarily describes the provider device 110a or the transportation matching system 104 as performing the actions as a shorthand. While the provider device 110a appears as a mobile device (e.g., smartphone) in FIGS. 6A-6C, the provider device 110a may alternatively be any type of computing device, such as a desktop, laptop, or tablet, and may also detect any suitable user interaction, including, but not limited to, an audio input into a microphone, a keyboard input, a mouse click, a stylus interaction with a touch screen, or a touch gesture on a touch screen.

As shown in FIG. 6A, for example, the provider device 110a presents a graphical user interface 604a comprising a notification 606 within a screen 602. The notification 606 may constitute a push notification or a pull notification. Accordingly, the transportation matching system 104 can either push the notification 606 to the provider device 110a or receive a pull from the provider device 110a before sending the notification 606. After identifying a final adjusted allocation of transportation providers, in some embodiments, the transportation matching system 104 sends the notification 606 to the provider device 110a to notify the provider 114a of available provider-rate premiums for one or more geocoded regions. In this particular embodiment, the notification 606 states, "Earn a Ride Bonus in a Demand Area Nearby." But the transportation matching system 104 may use any other suitable language in notifications of provider-rate premiums.

As indicated by FIG. 6A, in some embodiments, the notification 606 includes a selectable option that, when selected by the provider 114a, causes the provider device 110a to present a graphical user interface for a map identifying provider-rate premiums by location or zone. In response to a user interaction with such a selectable option, for example, the provider device 110a can open the provider application 112a-before presenting a graphical user interface including a map identifying provider premiums for geocoded areas. FIG. 6B depicts an example of the provider device 110a presenting such a graphical user interface based on detecting a user interaction with the notification 606.

As illustrated in FIG. 6B, the provider device 110a presents a graphical user interface 604b comprising a mapping interface portion 620a and an accumulation interface portion 622b within the screen 602. The mapping interface portion 620a includes a map 608a that includes an inner zone 610, an outer zone 612, and a provider location 614a (i.e., current location). In some cases, the map 608a constitutes a heat map identifying different zones in different colors or shades. The accumulation interface portion 622b of the graphical user interface 604b includes premium instructions 616a and an incremental accumulation metric 618a.

In some implementations, the transportation matching system 104 generates the graphical user interface 604b for a selected transportation provider to incentivize the transportation provider to travel from the provider location 614a to a target area indicated by the inner zone 610. Consistent with the disclosure above, the target area indicated by the inner zone 610 may include one or more target geocoded areas. In response to detecting the transportation vehicle 108a (and the provider device 110a) traveling to the target area, the transportation matching system 104 offers a predicted premium (or an accumulation incentive) for one or both of accepting a transportation request and for transporting a requester to a destination. The predicted premium in the incremental accumulation metric 618a accordingly incentivizes the provider 114a to travel to one or more target geocoded areas from an initial target geocoded area based on a final adjusted allocation of transportation providers.

As indicated in FIG. 6B, in certain implementations, the map 608a is centered on or includes a full view of the target area (identified by the inner zone 610) and remains fixed while the provider location 614a changes to reflect the movement of the transportation vehicle 108a and the provider device 110a. In alternative embodiments, the map 608a is centered around the provider location 614a. But the transportation matching system 104 can scale the map 608a for the graphical user interface 604b to display both the provider location 614a and the full border of the zone within which the provider 114a is currently located (or all zones, if not within any zone). As the transportation vehicle 108a (and the provider device 110a) crosses into smaller zones, the transportation matching system 104 can accordingly zoom in on the map 608a to show the current zone and any interior zones.

In response to a transportation provider traveling to one or more target areas based on premiums to fulfill transportation requests and performing transportation events, the transportation matching system 104 can generate geospatial-based-proportion metrics for the transportation provider. For example, FIG. 6C illustrates an example of the transportation matching system 104 providing a notification 624 to the provider device 110a indicating a proportional premium according to (e.g., in the amount of) a geospatial-based-proportion metric that the transportation matching system 104 generated for the transportation provider. In particular, the transportation matching system 104 can calculate the geospatial-based-proportion metric based on one or more geocoded areas corresponding to geocode-specific repositories storing positive values for cumulative-events metrics (e.g., based on receiving premiums corresponding to transportation events). The transportation matching system 104 can then provide the notification 624 including information about the geospatial-based-proportion metric to the provider device 110a for display within a graphical user interface 604c.

In one or more embodiments, the transportation matching system 104 can provide the notification 624 including information about the geospatial-based-proportion metric after the transportation provider completes servicing a transportation request. For example, after a transportation provider drops off a transportation requester at a destination location, the transportation matching system 104 can provide the notification 624 to the provider device 110a for display within the graphical user interface 604c. Alternatively, the transportation matching system 104 can provide the notification 624 at a later time to indicate a cumulation of geospatial-based-proportion metrics to the provider device 110a. For instance, at the later date (e.g., at a specific time of the week), the transportation matching system 104 can provide the notification 624 to indicate a sum of all of the geospatial-based-proportion metrics generated for the transportation provider over the time period based on the transportation provider performing transportation events relative to a number of such geocoded areas. The transportation matching system 104 can thus provide notifications to a plurality of provider devices indicating the cumulation of geospatial-based-proportion metrics through the time period in connection with any number of geocoded areas across one or more regions.

In one or more embodiments, the transportation matching system 104 uses geocode-specific repositories associated with the geocoded areas to generate the geospatial-based-proportion metrics. As previously noted, the transportation matching system 104 can also utilize regional repositories for providing premiums to provider devices. To manage the contents of the regional repositories, the transportation matching system 104 can increment a value stored in the regional repositories for each new transportation event. To illustrate, the transportation matching system 104 can contribute a portion of the value from each completed transportation request to the value stored in a regional repository corresponding to the geocoded area of the transportation request. As an example, the transportation matching system 104 can contribute 80% of the value of the completed transportation request to the geocode-specific repository of the geocoded area and 20% of the value of the completed transportation request to the regional repository. As indicated above, the transportation matching system can contribute a portion of either a realized or an unrealized value for a completed transport or yet-to-be-completed transport to a regional repository. Alternatively, the transportation matching system 104 can contribute to a value of the regional repository independently from the completed transportation requests. By maintaining regional repositories, the transportation matching system 104 can generate geospatial-based-proportion metrics without first requiring the corresponding geocode-specific repositories to accumulate value in the stored cumulative-events metrics when allocating transportation providers.

Figure 7A:
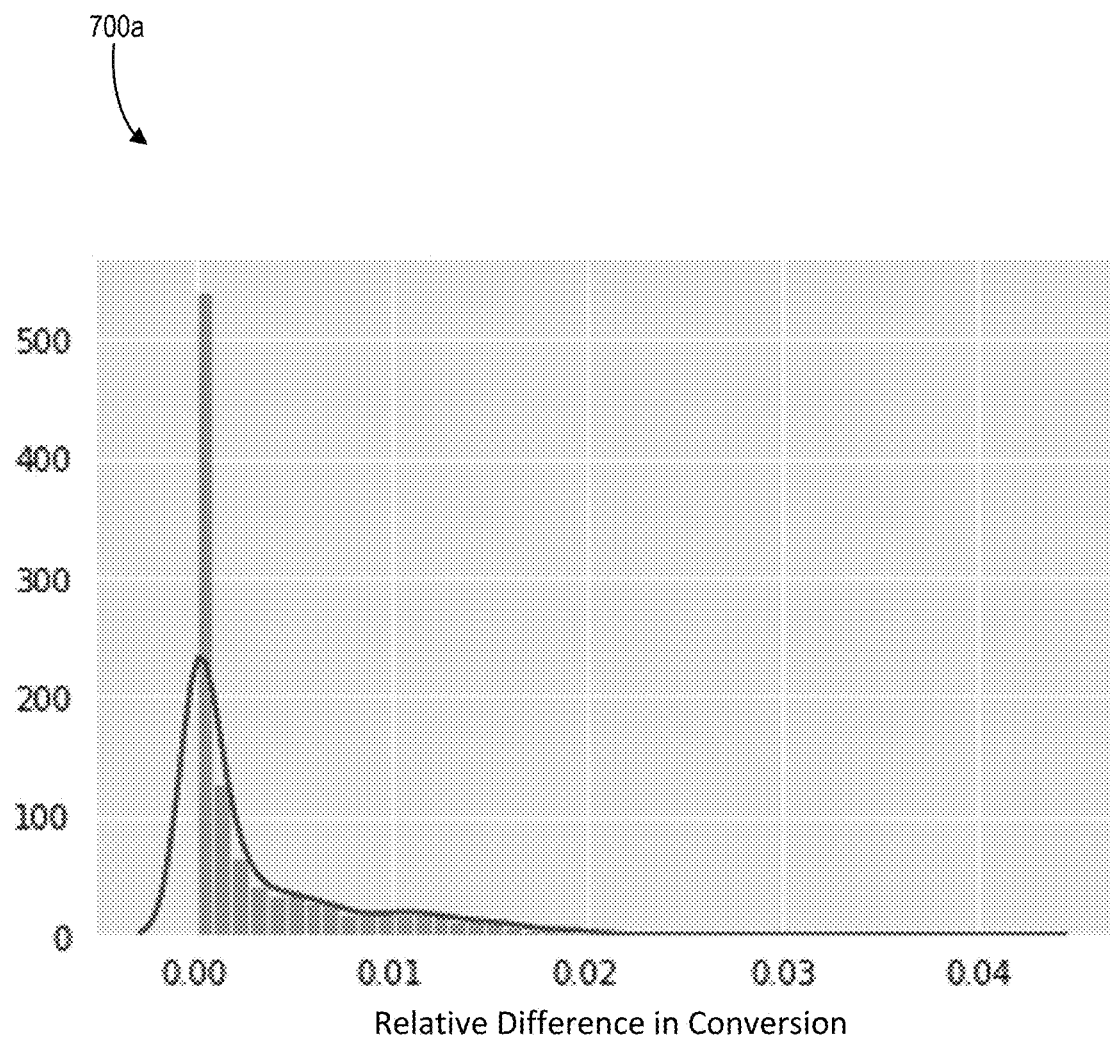
FIG. 7A illustrates a graph demonstrating improved conversion rates utilizing geospatial-based-proportion metrics across geocoded areas in accordance with one or more embodiments.
Figure 7B:
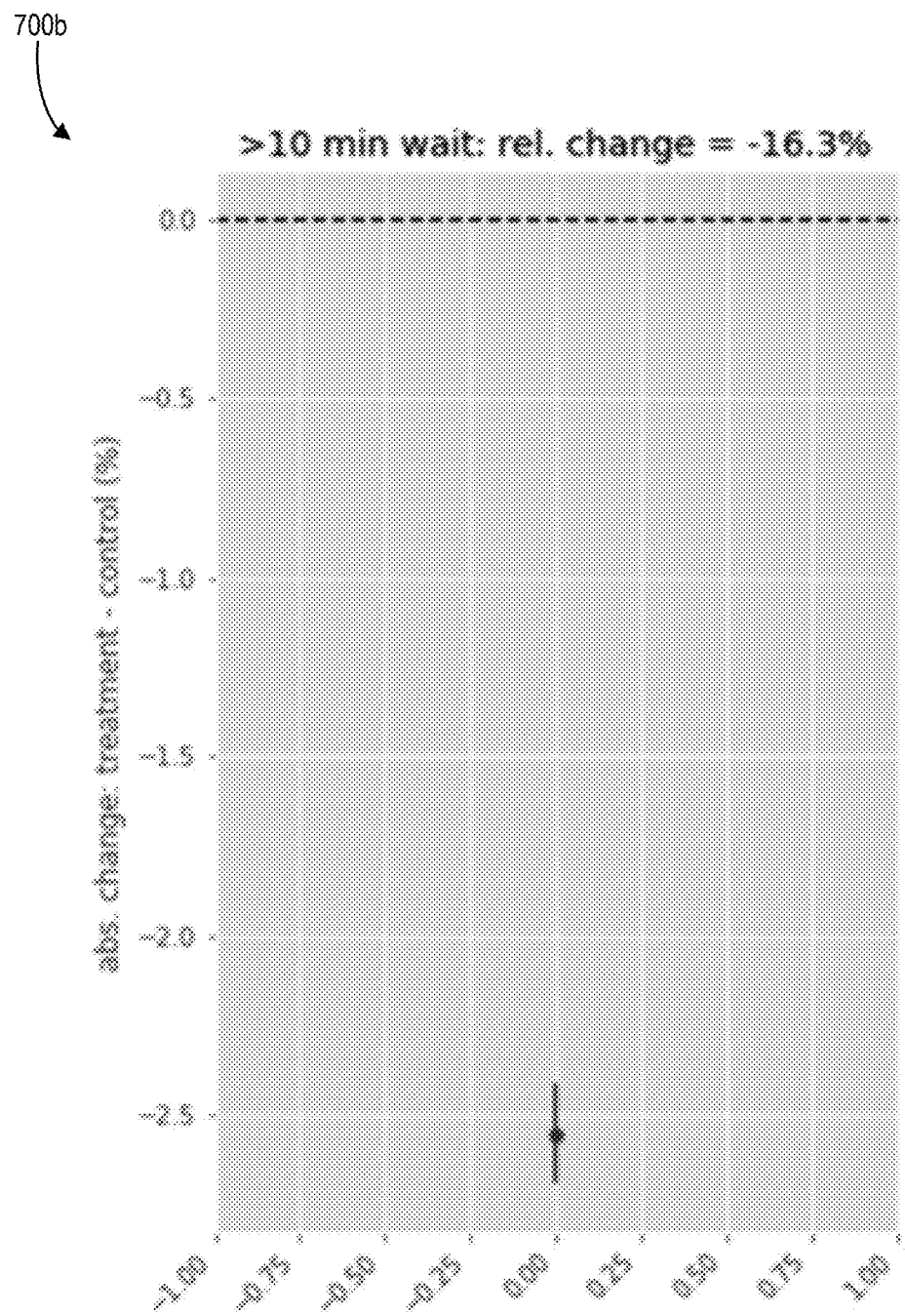
FIG. 7B illustrates a graph demonstrating reduced transportation request wait times utilizing geospatial-based-proportion metrics across geocoded areas in accordance with one or more embodiments.

As noted above, in certain implementations, the transportation matching system 104 improves the accuracy and efficiency with which a transportation-network system allocates transportation providers across geocoded areas based on more accurate and proportional geospatial-based-proportion metrics. FIGS. 7A and 7B illustrate that the transportation matching system 104 provides improved accuracy and efficiency over conventional transportation-network systems. In particular, FIG. 7A illustrates a conversion-gain-plot graph 700a depicting results from a comparison in terms of a conversion metric. FIG. 7B illustrates a request-wait-time-plot graph 700b depicting results indicating an effect of utilizing geospatial-based-proportion metrics on transportation request wait times across a plurality of geographic locations. For example, utilizing geospatial-based-proportion metrics improves the transportation matching system, resulting in a reduction of transportation requests that have greater than a 10-minute wait until pick-up. Specifically, as illustrated in FIG. 7B, the geospatial-based-proportion metrics resulted in a measured change of transportation requests with greater than a 10-minute wait until pick-up by −16.3% (absolute change) and −2.55% (absolute change) over measured time periods. Thus, the geospatial-based-proportion metrics significantly improved the likelihood of compliance of transportation providers across the measured geocoded areas than without the geospatial-based-proportion metrics.

The conversion-gain-plot graph 700a of FIG. 7A illustrates results from simulations performed to validate performance in scenarios in which the transportation matching system 104 provides proportional premiums to transportation providers according to geospatial-based-proportion metrics. In particular, the simulations correspond to regions in a metropolitan area of the United States that regularly experiences high provider utilization and transportation requests (or transportation request values). Specifically, the simulations selected the top eight busiest time intervals each day for three months and solved the above-described objective problem (using the Operator Splitting QP Solver on a computing device comprising r5d.24xlarge instances with 48 cores and 768 gigabytes of memory) to generate geospatial-based-proportion metrics. A time interval is regarded as busier if it has a greater number of geocoded areas with nonzero demand and supply.

As shown in FIG. 7A, the conversion-gain-plot graph 700a represents the positive part of the difference between expected per-geocoded-area conversions of the transportation matching system 104 over a conventional transportation-network system with a "cleaning" adjustment (+0.256% raw allocations, +0.250% clean allocations). In the cleaning adjustment, the transportation matching system 104 disregards an adjusted value representing an allocation of transportation providers within a particular geocoded area (e.g., in an allocation matrix) if a final allocation of transportation providers adjusts values for a particular geocoded area less than 5% in value. Such a cleaning adjustment attempts to prevent the transportation matching system 104 from allocating transportation providers due to a numerical inaccuracy. As shown, the conversion-gain-plot graph 700a indicates that the transportation matching system 104 providing geospatial-based-proportion metrics results in a higher relative conversion rate over conventional systems.

FIG. 7B illustrates the request-wait-time-plot graph 700b indicating a comparison over conventional transportation-network system in terms of transportation request wait times. Specifically, the transportation matching system 104 determines a metric indicating the percentage of premiums that result in greater than a ten-minute wait time for transportation requests. As illustrated in FIG. 7B, the transportation matching system 104 provides an improvement over conventional systems by reducing the number of premiums that result in greater than ten-minute wait times by 16.3%.

Figure 8:
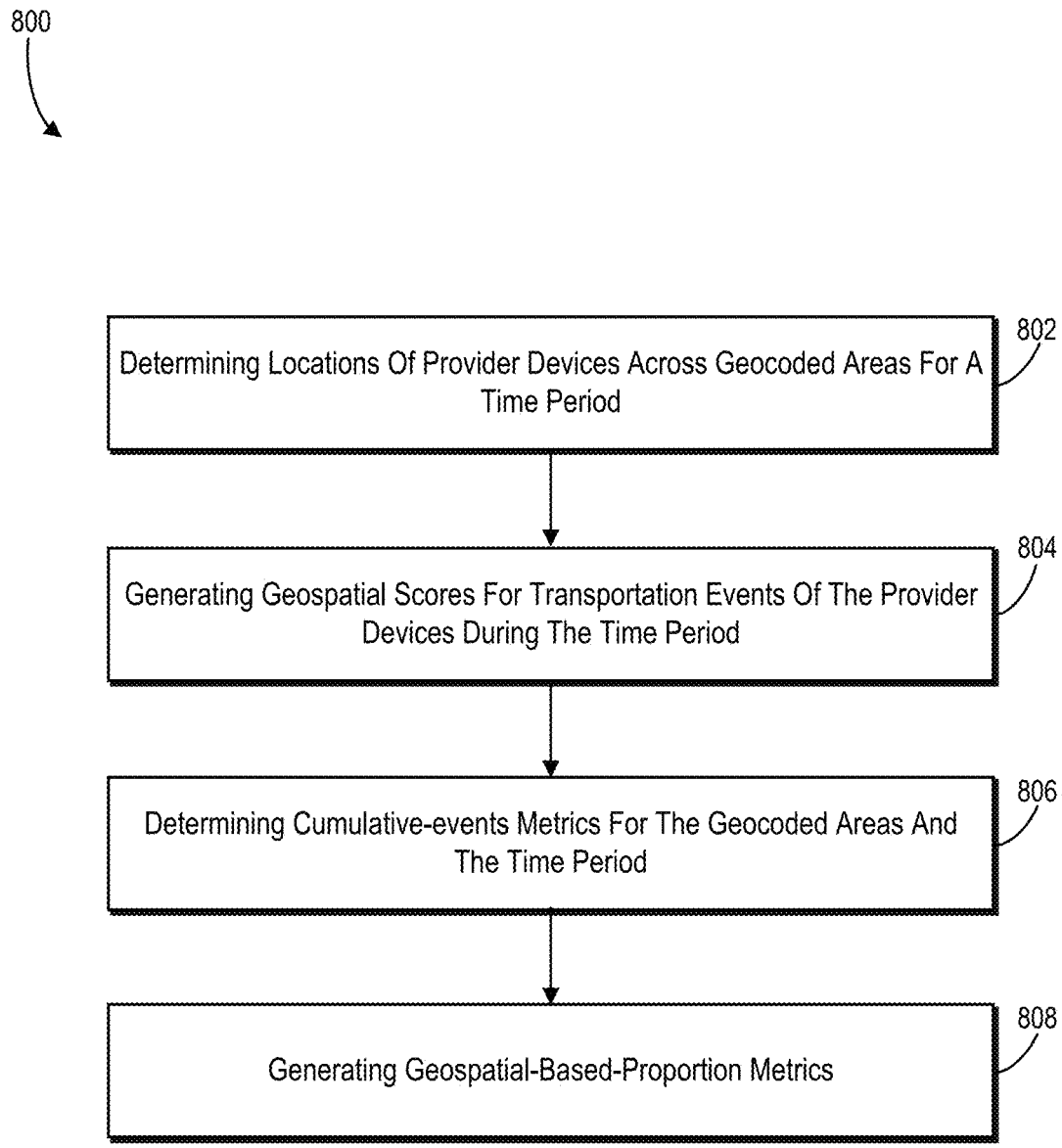
FIG. 8 illustrates a flowchart of a series of acts for determining locations and geospatial scores for transportation events relative to geocoded areas at a given time period and generating geospatial-based-proportion metrics for provider devices corresponding to such transportation events in accordance with one or more embodiments.

Turning now to FIG. 8, this figure illustrates a flowchart of a series of acts 800 of a transportation matching system dynamically generating geospatial-based-proportion metrics based on geospatial locations of transportation events of provider devices relative to geocoded areas using geocode-specific repositories and regional repositories. While FIG. 8 illustrates acts according to one embodiment, alternative embodiments may omit, add to, reorder, and/or modify any of the acts shown in FIG. 8. The acts of FIG. 8 can be performed as part of a method. Alternatively, a non-transitory computer readable storage medium can comprise instructions that, when executed by one or more processors, cause a computing device to perform the acts depicted in FIG. 8. In still further embodiments, a system can perform the acts of FIG. 8.

As shown in FIG. 8, the acts 800 include an act 802 of determining locations of provider devices across geocoded areas for a time period. For example, act 802 can involve obtaining the locations of the provider devices via a provider application on the provider devices. Additionally, act 802 can involve obtaining the locations of the provider devices based on GPS data associated with the provider devices. In one or more embodiments, act 802 can involve determining the locations of the provider devices in response to detecting transportation events involving the provider devices. For instance, the transportation events can include pick-up events or drop-off events associated with transportation requests associated with the provider devices.

The acts 800 also include an act 804 of generating geospatial scores for transportation events of the provider devices during the time period. For example, act 804 involves generating geospatial scores for transportation events of the provider devices during the time period relative to the geocoded areas based on particular locations and particular times of the transportation events relative to the geocoded areas. Act 804 can involve generating the geospatial scores for the transportation events based on locations of the provider devices at the particular times of the transportation events relative to the geocoded areas. For example, act 804 can involve generating a geospatial score for a transportation event of a provider device based on an estimated travel time of the provider device to reach a geocoded area from a current location of the provider device.

The acts 800 further include an act 806 of determining cumulative-events metrics for the geocoded areas and the time period. For example, act 806 can involve incrementing, for each transportation event within the particular geocoded area for the time period, a value for the cumulative-events metric corresponding to the geocoded area. Act 806 can further involve storing the cumulative-events metric in a geocode-specific repository for the particular geocoded area.

Act 806 can involve determining an allocation of provider devices across the geocoded areas based on the locations of provider devices and a projected number of transportation requests across the geocoded areas for the time period. Act 806 can then involve determining a transportation-value metric for the particular geocoded area for the time period based on the allocation of provider devices and a target number of provider devices within the particular geocoded area to receive premiums according to the geospatial-based-proportion metrics. Furthermore, act 806 can involve determining the cumulative-events metric for the particular geocoded area and the time period based on a number of transportation requests within the particular geocoded area for the time period and the transportation-value metric.

Additionally, the acts 800 include an act 808 of generating geospatial-based-proportion metrics. For example, act 808 involves generating geospatial-based-proportion metrics based on the geospatial scores for the transportation events and corresponding portions of the cumulative-event metrics.

Act 808 can also involve determining a target premium metric for a particular geocoded area based on an allocation of provider devices across the geocoded areas. Act 808 can then involve iteratively adjusting a value for a premium metric for the particular geocoded area to reduce a difference between the premium metric and the target premium metric. For example, act 808 can also involve iteratively adjusting the value for the premium metric to reduce the difference between the premium metric and the target premium metric based in part on a balanced-treatment constraint by comparing the premium metric according to an allocation-flow matrix for the geocoded areas to cumulative-event metrics and cumulative-reserve metrics according to a contribution matrix for the geocoded areas. Additionally, act 808 can involve generating the geospatial-based-proportion metrics based further on the adjusted value of the premium metric.

As part of act 808, or as an additional act, the acts 800 can also include determining a difference between the cumulative-events metric stored in the geocode-specific repository for the particular geocoded area and a cumulation of the geospatial-based-proportion metrics for the particular geocoded area and the time period. Act 810 can then involve generating premiums for the provider devices according to the geospatial-based-proportion metrics based on the cumulative-events metric stored in the geocode-specific repository and a cumulative-reserve metric from a regional repository for the geocoded areas.

Additionally, in some embodiments, the acts 800 can also include an act of providing, for display by the provider devices, customized instructions guiding transportation vehicles toward one or more target geocoded areas from the geocoded areas based on the locations of the provider devices across the geocoded areas for the time period.

Embodiments of the present disclosure may comprise or utilize a special-purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or generators and/or other electronic devices. When information is transferred, or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface generator (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In one or more embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural marketing features and/or methodological acts, it is to be understood that the subject matter defined in the appended claims is not necessarily limited to the described marketing features or acts described above. Rather, the described marketing features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program generators may be located in both local and remote memory storage devices.

Embodiments of the present disclosure can also be implemented in cloud computing environments. In this description, "cloud computing" is defined as a subscription model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing subscription model can be composed of various characteristics such as, for example, on-demand self-service, broad network access, resource pooling, rapid elasticity, measured service, and so forth. A cloud-computing subscription model can also expose various service subscription models, such as, for example, Software as a Service ("SaaS"), a web service, Platform as a Service ("PaaS"), and Infrastructure as a Service ("IaaS"). A cloud-computing subscription model can also be deployed using different deployment subscription models such as private cloud, community cloud, public cloud, hybrid cloud, and so forth. In this description and in the claims, a "cloud-computing environment" is an environment in which cloud computing is employed.

Figure 9:
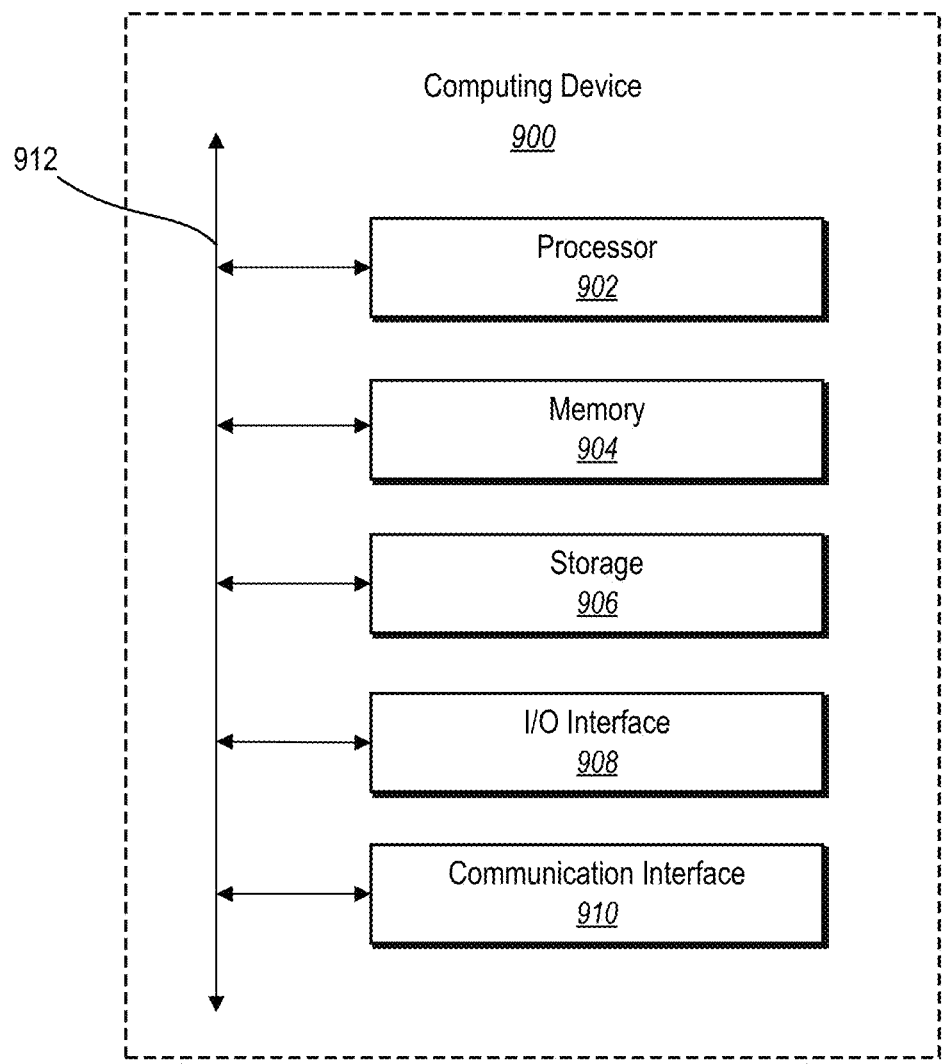
FIG. 9 illustrates a block diagram of a computing device in accordance with one or more embodiments.

FIG. 9 illustrates a block diagram of an example computing device 900 that may be configured to perform one or more of the processes described above. One will appreciate that one or more computing devices, such as the computing device 900 may represent the computing devices described above (e.g., the server(s) 102, the provider devices 110*a*-110*n*, or the requester devices 116*a*-116*n*). In one or more embodiments, the computing device 900 may be a mobile device (e.g., a mobile telephone, a smartphone, a PDA, a tablet, a laptop, a camera, a tracker, a watch, a wearable device, etc.). In some embodiments, the computing device 900 may be a non-mobile device (e.g., a desktop computer or another type of client device). Further, the computing device 900 may be a server device that includes cloud-based processing and storage capabilities.

As shown in FIG. 9, the computing device 900 can include one or more processor(s) 902, memory 904, a storage device 906, input/output interfaces 908 (or "I/O interfaces 908"), and a communication interface 910, which may be communicatively coupled by way of a communication infrastructure (e.g., bus 912). While the computing device 900 is shown in FIG. 9, the components illustrated in FIG. 9 are not intended to be limiting. Additional or alternative components may be used in other embodiments. Furthermore, in certain embodiments, the computing device 900 includes fewer components than those shown in FIG. 9.

Components of the computing device 900 shown in FIG. 9 will now be described in additional detail.

In particular embodiments, the processor(s) 902 includes hardware for executing instructions, such as those making up a computer program. As an example, and not by way of limitation, to execute instructions, the processor(s) 902 may retrieve (or fetch) the instructions from an internal register, an internal cache, memory 904, or a storage device 906 and decode and execute them.

The computing device 900 includes the memory 904, which is coupled to the processor(s) 902. The memory 904 may be used for storing data, metadata, and programs for execution by the processor(s). The memory 904 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 904 may be internal or distributed memory.

The computing device 900 includes the storage device 906 for storing data or instructions. As an example, and not by way of limitation, the storage device 906 can include a non-transitory storage medium described above. The storage device 906 may include a hard disk drive ("HDD"), flash memory, a Universal Serial Bus ("USB") drive or a combination these or other storage devices.

As shown, the computing device 900 includes one or more I/O interfaces 908, which are provided to allow a user to provide input to (such as user strokes), receive output from, and otherwise transfer data to and from the computing device 900. These I/O interfaces 908 may include a mouse, keypad or a keyboard, a touch screen, camera, optical scanner, network interface, modem, other known I/O devices or a combination of such I/O interfaces 908. The touch screen may be activated with a stylus or a finger.

The I/O interfaces 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 908 are configured to provide graphical data to a display for presentation to a user. The graphical data may be representative of one or more graphical user interfaces and/or any other graphical content as may serve a particular implementation.

The computing device 900 can further include a communication interface 910. The communication interface 910 can include hardware, software, or both. The communication interface 910 provides one or more interfaces for communication (such as, for example, packet-based communication) between the computing device and one or more other computing devices or one or more networks. As an example, and not by way of limitation, communication interface 910 may include a network interface controller ("NIC") or network adapter for communicating with an Ethernet or other wire-based network or a wireless NIC ("WNIC") or wireless adapter for communicating with a wireless network, such as a WI-FI. The computing device 900 can further include the bus 912. The bus 912 can include hardware, software, or both that connects components of computing device 900 to each other.

Figure 10:
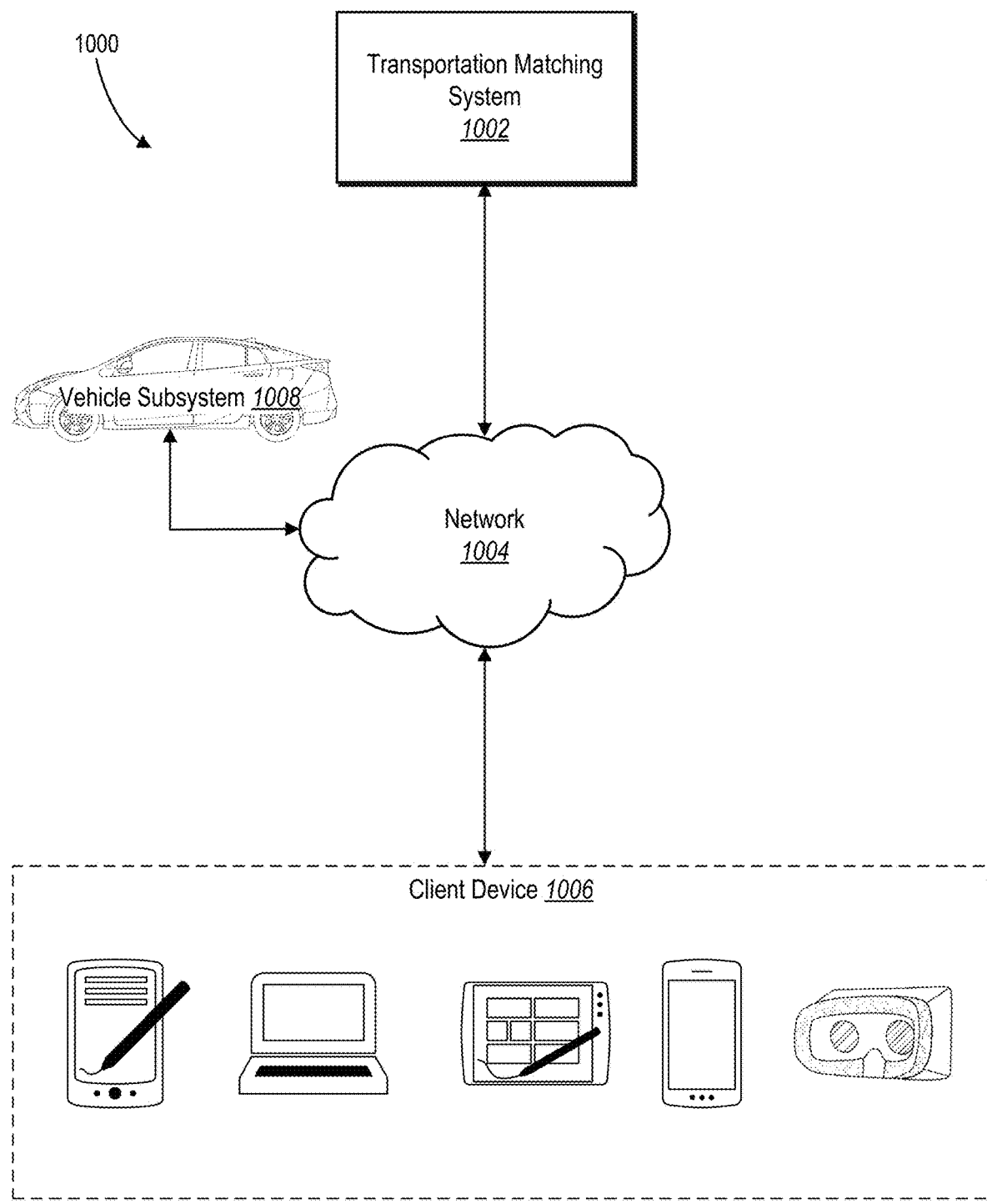
FIG. 10 illustrates an example environment for a transportation matching system in accordance with one or more embodiments.

FIG. 10 illustrates an example network environment 1000 of a transportation matching system (e.g., the transportation matching system 104). The network environment 1000 includes a client device 1006, a transportation matching system 1002, and a vehicle subsystem 1008 connected to each other by a network 1004. Although FIG. 10 illustrates a particular arrangement of the client device 1006, the transportation matching system 1002, the vehicle subsystem 1008, and the network 1004, this disclosure contemplates any suitable arrangement of the client device 1006, the transportation matching system 1002, the vehicle subsystem 1008, and the network 1004. As an example, and not by way of limitation, two or more of the client device 1006, the transportation matching system 1002, and the vehicle subsystem 1008 communicate directly, bypassing the network 1004. As another example, two or more of the client device 1006, the transportation matching system 1002, and the vehicle subsystem 1008 may be physically or logically co-located with each other in whole or in part. Moreover, although FIG. 10 illustrates a particular number of the client devices 1006, the transportation matching systems 1002, the vehicle subsystems 1008, and the networks 1004, this disclosure contemplates any suitable number of the client devices 1006, the transportation matching systems 1002, the vehicle subsystems 1008, and the networks 1004. As an example, and not by way of limitation, the network environment 1000 may include multiple client devices 1006, multiple transportation matching systems 1002, multiple vehicle subsystems 1008, and multiple networks 1004.

This disclosure contemplates any suitable network 1004. As an example, and not by way of limitation, one or more portions of the network 1004 may include an ad hoc network, an intranet, an extranet, a virtual private network ("VPN"), a local area network ("LAN"), a wireless LAN ("WLAN"), a wide area network ("WAN"), a wireless WAN ("WWAN"), a metropolitan area network ("MAN"), a portion of the Internet, a portion of the Public Switched Telephone Network ("PSTN"), a cellular telephone network, or a combination of two or more of these. The network 1004 may include one or more networks 1004.

Links may connect the client device 1006, the transportation matching system 1002, and the vehicle subsystem 1008 to the network 1004 or to each other. This disclosure contemplates any suitable links. In particular embodiments, one or more links include one or more wireline (such as for example Digital Subscriber Line ("DSL") or Data Over Cable Service Interface Specification ("DOCSIS"), wireless (such as for example Wi-Fi or Worldwide Interoperability for Microwave Access ("WiMAX"), or optical (such as for example Synchronous Optical Network ("SONET") or Synchronous Digital Hierarchy ("SDH") links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout the network environment 1000. One or more first links may differ in one or more respects from one or more second links.

In particular embodiments, the client device 1006 may be an electronic device including hardware, software, or embedded logic components or a combination of two or more such components and capable of carrying out the appropriate functionalities implemented or supported by the client device 1006. As an example, and not by way of limitation, a client device 1006 may include any of the computing devices discussed above in relation to FIG. 10. A client device 1006 may enable a network user at the client device 1006 to access a network. A client device 1006 may enable its user to communicate with other users at other client devices 1006.

In particular embodiments, the client device 1006 may include a transportation service application or a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at the client device 1006 may enter a Uniform Resource Locator ("URL") or other address directing the web browser to a particular server (such as server), and the web browser may generate a Hyper Text Transfer Protocol ("HTTP") request and communicate the HTTP request to server. The server may accept the HTTP request and communicate to client device 1006 one or more Hyper Text Markup Language ("HTML") files responsive to the HTTP request. The client device 1006 may render a webpage based on the HTML files from the server for presentation to the user. This disclosure contemplates any suitable webpage files. As an example, and not by way of limitation, webpages may render from HTML files, Extensible Hyper Text Markup Language ("XHTML") files, or Extensible Markup Language ("XML") files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, the transportation matching system 1002 may be a network-addressable computing system that can host a ride share transportation network. The transportation matching system 1002 may generate, store, receive, and send data, such as, for example, user-profile data, concept-profile data, text data, ride request data, GPS location data, provider data, requester data, vehicle data, or other suitable data related to the ride share transportation network. This may include authenticating the identity of providers and/or vehicles who are authorized to provide ride services through the transportation matching system 1002. In addition, the transportation service system may manage identities of service requesters such as users/requesters. In particular, the transportation service system may maintain requester data such as driving/riding histories, personal data, or other user data in addition to navigation and/or traffic management services or other location services (e.g., GPS services).

In particular embodiments, the transportation matching system 1002 may manage ride matching services to connect a user/requester with a vehicle and/or provider. By managing the ride matching services, the transportation matching system 1002 can manage the distribution and allocation of vehicle subsystem resources and user resources such as GPS location and availability indicators, as described herein.

The transportation matching system 1002 may be accessed by the other components of the network environment 1000 either directly or via network 1004. In particular embodiments, the transportation matching system 1002 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, the transportation matching system 1002 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable the client device 1006 or the transportation matching system 1002 to manage, retrieve, modify, add, or delete, the information stored in data storage.

In particular embodiments, the transportation matching system 1002 may provide users with the ability to take actions on various types of items or objects, supported by the transportation matching system 1002. As an example, and not by way of limitation, the items and objects may include ride share networks to which users of the transportation matching system 1002 may belong, vehicles that users may request, location designators, computer-based applications that a user may use, transactions that allow users to buy or sell items via the service, interactions with advertisements that a user may perform, or other suitable items or objects. A user may interact with anything that is capable of being represented in the transportation matching system 1002 or by an external system of a third-party system, which is separate from the transportation matching system 1002 and coupled to the transportation matching system 1002 via the network 1004.

In particular embodiments, the transportation matching system 1002 may be capable of linking a variety of entities. As an example, and not by way of limitation, the transportation matching system 1002 may enable users to interact with each other or other entities, or to allow users to interact with these entities through an application programming interfaces ("API") or other communication channels.

In particular embodiments, the transportation matching system 1002 may include a variety of servers, sub-systems, programs, modules, logs, and data stores. In particular embodiments, the transportation matching system 1002 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The transportation matching system 1002 may also include suitable components such as network interfaces, security mechanisms, load balancers, failover servers, management-and-network-operations consoles, other suitable components, or any suitable combination thereof. In particular embodiments, the transportation matching system 1002 may include one or more user-profile stores for storing user profiles. A user profile may include, for example, biographic information, demographic information, behavioral information, social information, or other types of descriptive information, such as work experience, educational history, hobbies or preferences, interests, affinities, or location.

The web server may include a mail server or other messaging functionality for receiving and routing messages between the transportation matching system 1002 and one or more client devices 1006. An action logger may be used to receive communications from a web server about a user's actions on or off the transportation matching system 1002. In conjunction with the action log, a third-party-content-object log may be maintained of user exposures to third-party-content objects. A notification controller may provide information regarding content objects to the client device 1006. Information may be pushed to the client device 1006 as notifications, or information may be pulled from the client device 1006 responsive to a request received from the client device 1006. Authorization servers may be used to enforce one or more privacy settings of the users of the transportation matching system 1002. A privacy setting of a user determines how particular information associated with a user can be shared. The authorization server may allow users to opt in to or opt out of having their actions logged by the transportation matching system 1002 or shared with other systems, such as, for example, by setting appropriate privacy settings. Third-party-content-object stores may be used to store content objects received from third parties. Location stores may be used for storing location information received from the client devices 1006 associated with users.

In addition, the vehicle subsystem 1008 can include a human-operated vehicle or an autonomous vehicle. A provider of a human-operated vehicle can perform maneuvers to pick up, transport, and drop off one or more requesters according to the embodiments described herein. In certain embodiments, the vehicle subsystem 1008 can include an autonomous vehicle—i.e., a vehicle that does not require a human operator. In these embodiments, the vehicle subsystem 1008 can perform maneuvers, communicate, and otherwise function without the aid of a human provider, in accordance with available technology.

In particular embodiments, the vehicle subsystem 1008 may include one or more sensors incorporated therein or associated thereto. For example, sensor(s) can be mounted on the top of the vehicle subsystem 1008 or else can be located within the interior of the vehicle subsystem 1008. In certain embodiments, the sensor(s) can be located in multiple areas at once—i.e., split up throughout the vehicle subsystem 1008 so that different components of the sensor(s) can be placed in different locations in accordance with optimal operation of the sensor(s). In these embodiments, the sensor(s) can include a LIDAR sensor and an inertial measurement unit ("IMU") including one or more accelerometers, one or more gyroscopes, and one or more magnetometers. The sensor suite can additionally or alternatively include a wireless IMU ("WIMU"), one or more cameras, one or more microphones, or other sensors or data input devices capable of receiving and/or recording information relating to navigating a route to pick up, transport, and/or drop off a requester.

In particular embodiments, the vehicle subsystem 1008 may include a communication device capable of communicating with the client device 1006 and/or the transportation matching system 1002. For example, the vehicle subsystem 1008 can include an on-board computing device communicatively linked to the network 1004 to transmit and receive data such as GPS location information, sensor-related information, requester location information, or other relevant information.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

We claim:

1. A method comprising:
   determining, by one or more servers of a transportation matching system, locations of provider devices across geocoded areas for a time period based on GPS locators of the provider devices providing GPS data associated with the provider devices at regular intervals during the time period to the one or more servers;
   generating, by the one or more servers of the transportation matching system and based on the GPS data provided by the provider devices at the regular intervals, geospatial scores for transportation events of the provider devices during the time period relative to the geocoded areas comprising measurement representations of particular locations and particular times of the transportation events relative to the geocoded areas, the transportation events occurring as part of transportation requests assigned to the provider devices and the geospatial scores indicating measurements of distances and times from the transportation events to the geocoded areas, the transportation events comprising pick-up events, drop-off events, or movement of the provider devices occurring as part of the transportation requests relative to the geocoded areas;
   determining, by the one or more servers of the transportation matching system utilizing the GPS data provided by the provider devices at the regular intervals and for the geocoded areas, cumulative-events metrics indicating cumulative values of the transportation events occurring within or through the geocoded areas and during the time period by incrementing the cumulative values stored in geocode-specific repositories for the geocoded areas each time a pick-up event, a drop-off event, or a tracked movement of a provider occurs as part of a transportation request within or through the geocoded areas;
   generating geospatial-based-proportion metrics for the transportation events based on combinations of the geospatial scores of the transportation events and portions of the cumulative-events metrics from the geocode-specific repositories of corresponding geocoded areas;
   generating, in response to a provider device of the provider devices approaching one or more target geocoded areas, a heatmap indicating an inner zone surrounding one or more target geocoded areas, an outer zone surrounding the inner zone, a location of the provider device relative to the inner zone and the outer zone, and the geospatial-based-proportion metrics of the transportation events occurring within or through the one or more target geocoded areas; and
   providing the heatmap for display within a map in a mapping interface of a provider application of the provider device.

2. The method of claim 1, wherein determining a cumulative-events metric for a particular geocoded area comprises:
   incrementing, for each transportation event within the particular geocoded area for the time period, a value for the cumulative-events metric corresponding to the particular geocoded area; and
   storing the cumulative-events metric in a geocode-specific repository for the particular geocoded area.

3. The method of claim 2, further comprising:
   determining a difference between the cumulative-events metric stored in the geocode-specific repository for the particular geocoded area and a cumulation of the geospatial-based-proportion metrics for the particular geocoded area and the time period; and
   generating premiums for the provider devices according to the geospatial-based-proportion metrics based on the cumulative-events metric stored in the geocode-specific repository and a cumulative-reserve metric from a regional repository for the geocoded areas.

4. The method of claim 1, further comprising:
   providing, for display by the provider device of the provider devices, customized instructions guiding a transportation vehicle corresponding to the provider device toward a target geocoded area of the one or more target geocoded areas based on the location of the provider device relative to the target geocoded area for the time period;
   providing, in response to detecting the provider device of the provider device traveling to a target geocoded area, an indication of a premium for the provider device according to a geospatial-based-proportion metric for the target geocoded area; and
   scaling the heatmap to include the location of the provider device, the inner zone surrounding the one or more target geocoded areas, and the outer zone surrounding the inner zone within the mapping interface.

5. The method of claim 1, wherein determining a cumulative-events metric for a particular geocoded area of the geocoded areas and the time period comprises:
   determining an allocation of provider devices across the geocoded areas based on the locations of the provider devices and a projected number of transportation requests across the geocoded areas for the time period;
   determining a transportation-value metric for the particular geocoded area for the time period based on the allocation of provider devices and a target number of provider devices within the particular geocoded area to receive premiums according to the geospatial-based-proportion metrics; and
   determining the cumulative-events metric for the particular geocoded area and the time period based on a number of transportation requests within the particular geocoded area for the time period and the transportation-value metric.

6. The method of claim 1, wherein generating the geospatial-based-proportion metrics further comprises:
   determining a target premium metric for a particular geocoded area based on an allocation of provider devices across the geocoded areas;
   iteratively adjusting a value for a premium metric for the particular geocoded area to reduce a difference between the premium metric and the target premium metric; and generating the geospatial-based-proportion metrics based further on the adjusted value of the premium metric.

7. The method of claim 6, further comprising iteratively adjusting the value for the premium metric to reduce the difference between the premium metric and the target premium metric based in part on a balanced-treatment constraint by comparing the premium metric according to an allocation-flow matrix for the geocoded areas to cumulative-event metrics and cumulative-reserve metrics according to a contribution matrix for the geocoded areas.

8. A system comprising:
at least one processor; and
a non-transitory computer readable storage medium comprising instructions that, when executed by the at least one processor, cause the system to:
determine, by one or more servers of a transportation matching system, locations of provider devices across geocoded areas for a time period based on GPS locators of the provider devices providing GPS data associated with the provider devices at regular intervals during the time period to the one or more servers;
generate, by the one or more servers of the transportation matching system and based on the GPS data provided by the provider devices at the regular intervals, geospatial scores for transportation events of the provider devices during the time period relative to the geocoded areas comprising measurement representations of particular locations and particular times of the transportation events relative to the geocoded areas, the transportation events occurring as part of transportation requests assigned to the provider devices and the geospatial scores indicating measurements of distances and times from the transportation events to the geocoded areas, the transportation events comprising pick-up events, drop-off events, or movement of the provider devices occurring as part of the transportation requests relative to the geocoded areas;
determine, by the one or more servers of the transportation matching system utilizing the GPS data provided by the provider devices at the regular intervals and for the geocoded areas, cumulative-events metrics indicating cumulative values of the transportation events occurring within or through the geocoded areas and during the time period by incrementing the cumulative values stored in geocode-specific repositories for the geocoded areas each time a pick-up event, a drop-off event, or a tracked movement of a provider occurs as part of a transportation request within or through the geocoded areas;
generate geospatial-based-proportion metrics for the transportation events based on combinations of the geospatial scores of the transportation events and portions of the cumulative-events metrics from the geocode-specific repositories of corresponding geocoded areas;
generate, in response to a provider device of the provider devices approaching one or more target geocoded areas, a heatmap indicating an inner zone surrounding one or more target geocoded areas, an outer zone surrounding the inner zone, a location of the provider device relative to the inner zone and the outer zone, and the geospatial-based-proportion metrics of the transportation events occurring within or through the one or more target geocoded areas; and
providing the heatmap for display within a map in a mapping interface of a provider application of the provider device.

9. The system of claim 8, further comprising instructions that, when executed by the at least one processor, cause the system to determine a cumulative-events metric for a particular geocoded area by:
incrementing, for each transportation event within the particular geocoded area for the time period, a value for the cumulative-events metric corresponding to the particular geocoded area; and
storing the cumulative-events metric in a geocode-specific repository for the particular geocoded area.

10. The system of claim 9, further comprising instructions that, when executed by the at least one processor, cause the system to:
determine a difference between the cumulative-events metric stored in the geocode-specific repository for the particular geocoded area and a cumulation of the geospatial-based-proportion metrics for the particular geocoded area and the time period; and
generate premiums for the provider devices according to the geospatial-based-proportion metrics based on the cumulative-events metric stored in the geocode-specific repository and a cumulative-reserve metric from a regional repository for the geocoded areas.

11. The system of claim 8, further comprising instructions that, when executed by the at least one processor, cause the system to:
provide, for display by the provider device of the provider devices, customized instructions guiding a transportation vehicle toward a target geocoded area from a first geocoded area of the geocoded areas based on the location of the provider device across the geocoded areas for the time period, the customized instructions comprising indications of premiums for the provider device according to the geospatial-based-proportion metrics;
cause the provider device to display the heatmap including the target geocoded area and the location of the provider device while modifying the location of the provider device to reflect movement of the transportation vehicle toward the target geocoded area.

12. The system of claim 8, further comprising instructions that, when executed by the at least one processor, cause the system to determine a cumulative-events metric for a particular geocoded area of the geocoded areas and the time period by:
determining an allocation of provider devices across the geocoded areas based on the locations of the provider devices and a projected number of transportation requests across the geocoded areas for the time period;
determining a transportation-value metric for the particular geocoded area for the time period based on the allocation of provider devices and a target number of provider devices within the particular geocoded area to receive premiums according to the geospatial-based-proportion metrics; and
determining the cumulative-events metric for the particular geocoded area and the time period based on a number of transportation requests within the particular geocoded area for the time period and the transportation-value metric.

13. The system of claim 8, further comprising instructions that, when executed by the at least one processor, cause the system to generate the geospatial-based-proportion metrics by:
determining a target premium metric for a particular geocoded area based on an allocation of provider devices across the geocoded areas;

iteratively adjusting a value for a premium metric for the particular geocoded area to reduce a difference between the premium metric and the target premium metric; and generating the geospatial-based-proportion metrics based further on the adjusted value of the premium metric.

14. The system of claim 13, further comprising instructions that, when executed by the at least one processor, cause the system to iteratively adjust the value for the premium metric to reduce the difference between the premium metric and the target premium metric based in part on a balanced-treatment constraint by comparing the premium metric according to an allocation-flow matrix for the geocoded areas to cumulative-event metrics and cumulative-reserve metrics according to a contribution matrix for the geocoded areas.

15. A non-transitory computer readable storage medium comprising instructions that, when executed by at least one processor, cause a computing device to:

determine, by one or more servers of a transportation matching system, locations of provider devices across geocoded areas for a time period based on GPS locators of the provider devices providing GPS data associated with the provider devices at regular intervals during the time period to the one or more servers;

generate, by the one or more servers of the transportation matching system and based on the GPS data provided by the provider devices at the regular intervals, geospatial scores for transportation events of the provider devices during the time period relative to the geocoded areas comprising measurement representations of particular locations and particular times of the transportation events relative to the geocoded areas, the transportation events occurring as part of transportation requests assigned to the provider devices and the geospatial scores indicating measurements of distances and times from the transportation events to the geocoded areas, the transportation events comprising pick-up events, drop-off events, or movement of the provider devices occurring as part of the transportation requests relative to the geocoded areas;

determine, by the one or more servers of the transportation matching system utilizing the GPS data provided by the provider devices at the regular intervals and for the geocoded areas, cumulative-events metrics indicating cumulative values of the transportation events occurring within or through the geocoded areas and during the time period by incrementing the cumulative values stored in geocode-specific repositories for the geocoded areas each time a pick-up event, a drop-off event, or a tracked movement of a provider occurs as part of a transportation request within or through the geocoded areas;

generate geospatial-based-proportion metrics for the transportation events based on combinations of the geospatial scores of the transportation events and portions of the cumulative-events metrics from the geocode-specific repositories of corresponding geocoded areas;

generate, in response to a provider device of the provider devices approaching one or more target geocoded areas, a heatmap indicating an inner zone surrounding one or more target geocoded areas, an outer zone surrounding the inner zone, a location of the provider device relative to the inner zone and the outer zone, and the geospatial-based-proportion metrics of the transportation events occurring within or through the one or more target geocoded areas; and providing the heatmap for display within a map in a mapping interface of a provider application of the provider device.

16. The non-transitory computer readable storage medium of claim 15, further comprising instructions that, when executed by the at least one processor, cause the computing device to determine a cumulative-events metric for a particular geocoded area by:

incrementing, for each transportation event within the particular geocoded area for the time period, a value for the cumulative-events metric corresponding to the particular geocoded area; and storing the cumulative-events metric in a geocode-specific repository for the particular geocoded area.

17. The non-transitory computer readable storage medium of claim 16, further comprising instructions that, when executed by the at least one processor, cause the computing device to:

determine a difference between the cumulative-events metric stored in the geocode-specific repository for the particular geocoded area and a cumulation of the geospatial-based-proportion metrics for the particular geocoded area and the time period; and generate premiums for the provider devices according to the geospatial-based-proportion metrics based on the cumulative-events metric stored in the geocode-specific repository and a cumulative-reserve metric from a regional repository for the geocoded areas.

18. The non-transitory computer readable storage medium of claim 15, further comprising instructions that, when executed by the at least one processor, cause the computing device to:

provide, for display by the provider device of the provider devices, customized instructions guiding a transportation vehicle associated with the provider device toward the one or more target geocoded areas based on the location of the provider device; and provide the heatmap for display by the provider device by centering the mapping interface around the location of the provider device while scaling the heatmap to include the one or more target geocoded areas.

19. The non-transitory computer readable storage medium of claim 15, further comprising instructions that, when executed by the at least one processor, cause the computing device to determine a cumulative-events metric for a particular geocoded area of the geocoded areas and the time period by:

determining an allocation of provider devices across the geocoded areas based on the locations of the provider devices and a projected number of transportation requests across the geocoded areas for the time period;

determining a transportation-value metric for the particular geocoded area for the time period based on the allocation of provider devices and a target number of provider devices within the particular geocoded area to receive premiums according to the geospatial-based-proportion metrics; and determining the cumulative-events metric for the particular geocoded area and the time period based on a number of transportation requests within the particular geocoded area for the time period and the transportation-value metric.

20. The non-transitory computer readable storage medium of claim 15, further comprising instructions that, when executed by the at least one processor, cause the computing device to generate the geospatial-based-proportion metrics by:

determining a target premium metric for a particular geocoded area based on an allocation of provider devices across the geocoded areas;

iteratively adjusting a value for a premium metric for the particular geocoded area to reduce a difference between the premium metric and the target premium metric; and generating the geospatial-based-proportion metrics based further on the adjusted value of the premium metric.

* * * * *